US007925111B2

(12) United States Patent
Someya et al.

(10) Patent No.: US 7,925,111 B2
(45) Date of Patent: Apr. 12, 2011

(54) IMAGE PROCESSING APPARATUS AND METHOD, AND IMAGE CODING APPARATUS AND METHOD

(75) Inventors: Jun Someya, Tokyo (JP); Akihiro Nagase, Tokyo (JP); Noritaka Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 966 days.

(21) Appl. No.: 11/812,475

(22) Filed: Jun. 19, 2007

(65) Prior Publication Data

US 2008/0019598 A1 Jan. 24, 2008

(30) Foreign Application Priority Data

Jul. 18, 2006 (JP) ................................ 2006-195132

(51) Int. Cl.
*G06K 9/40* (2006.01)

(52) U.S. Cl. ...................................................... 382/274

(58) Field of Classification Search ........................ None
See application file for complete search history.

(56) References Cited

U.S. PATENT DOCUMENTS 5,345,268 A * 9/1994 Matsuta et al. ............ 348/384.1
6,014,121 A * 1/2000 Aratani et al. .................. 345/89
6,756,955 B2 6/2004 Someya et al.
7,034,788 B2 * 4/2006 Someya et al. ................. 345/89
7,327,340 B2 * 2/2008 Someya et al. ................. 345/89
7,373,022 B2 * 5/2008 Matsumoto ................... 382/305
7,403,183 B2 * 7/2008 Someya .......................... 345/98
7,436,382 B2 * 10/2008 Okuda et al. .................... 345/89
7,729,558 B2 * 6/2010 Kondo et al. ................ 382/275
2002/0140652 A1 * 10/2002 Suzuki et al. ................... 345/87
2003/0080983 A1 * 5/2003 Someya et al. ............... 345/690
2003/0231158 A1 * 12/2003 Someya et al. ............... 345/101
2004/0160617 A1 * 8/2004 Okuda et al. .................. 358/1.9
2004/0189565 A1 9/2004 Someya
2004/0217930 A1 * 11/2004 Someya et al. ................. 345/87

FOREIGN PATENT DOCUMENTS

JP 2616652 B2 3/1997
JP 2004-163842 A 6/2004

* cited by examiner

*Primary Examiner* — Yuzhen Ge
(74) *Attorney, Agent, or Firm* — Birch, Stewart, Kolasch & Birch, LLP

(57) ABSTRACT

An image processing circuit for driving a liquid crystal that encodes and decodes image data to reduce the size of the frame memory that, when it quantizes (45) each block of image data in the current frame and outputs encoded data, selects (44) a mean value on the basis of the dynamic range of each unit block and adjusts the amount by which the image data is reduced (53). This type of control enables it to reduce the amount of image data that must be temporarily stored in the delay circuit (5), so the size of the frame memory constituting the delay circuit can be reduced while minimizing the encoding error that occurs in the encoder (4). Consequently, the image data can be corrected accurately and appropriate voltage corrections can be applied to the liquid crystal without the effects of coding and decoding errors.

8 Claims, 16 Drawing Sheets

FIG.4(a)

| | | | |
|---|---|---|---|
| 50 | 200 | 100 | 150 |
| 50 | 100 | 200 | 150 |
| 150 | 100 | 10 | 100 |
| 150 | 240 | 50 | 200 |

FIG.4(b)

| | | | |
|---|---|---|---|
| 00 | 11 | 01 | 10 |
| 00 | 01 | 11 | 10 |
| 10 | 01 | 00 | 01 |
| 10 | 11 | 00 | 11 |

FIG.4(c)

| | | | |
|---|---|---|---|
| 40 | 210 | 99 | 151 |
| 40 | 99 | 210 | 151 |
| 151 | 99 | 40 | 99 |
| 151 | 210 | 40 | 210 |

4

6

IMAGE PROCESSING APPARATUS AND METHOD, AND IMAGE CODING APPARATUS AND METHOD

BACKGROUND OF THE INVENTION

1. Field of the Invention

The present invention relates to an image processing apparatus and image processing method for modifying image data expressing gray-scale values of pixels in an image according to variations in the gray-scale values at each pixel, the gray-scale values corresponding to voltages applied to a liquid crystal in a liquid crystal panel. The invention also relates to an image coding device and image coding method using this image processing apparatus and method.

2. Description of the Related Art

Liquid crystal panels are thin and lightweight, so they are widely used in display apparatus such as the display units of television receivers, computers, and mobile information terminals. However, they have the drawback of being incapable of dealing with rapidly changing moving pictures, because after application of a driving voltage, it takes some time for the desired transmittance to be reached. To solve this problem, a driving method that applies an excess voltage to the liquid crystal when the gray-scale value changes from frame to frame, so that the liquid crystal reaches the desired transmittance within one frame, has been adopted (patent document 1). More specifically, the image data of the current frame are compared pixel by pixel with the image data one frame before, and when there is a change in the gray-scale value, a correction corresponding to the change is added to the image data of the current frame. When the gray-scale values increases in comparison with the preceding frame, a driving voltage higher than the normal driving voltage is thereby applied to the liquid crystal panel; when the gray-scale value decreases, a driving voltage lower than the normal driving voltage is applied.

To practice the above method, it is necessary to have a frame memory from which to output the image data of the preceding frame. With the increasing numbers of pixels displayed on today's large liquid crystal panels, it becomes necessary to have an increasingly large frame memory. As the number of pixels increases, the amount of data that must be written into and read from the frame memory within a given time (within one frame interval, for example) also increases, so the frequency of the clock that controls the reading and writing of data and the data transfer rate must be increased. The increased size and transfer rate of the frame memory drive up the cost of the liquid crystal display apparatus.

To solve this problem, the image processing circuit for driving a liquid crystal described in patent document 2 reduces the size of the frame memory by encoding the image data before storing the image data in the frame memory. By correcting the image data on the basis of a comparison between decoded image data for the current frame obtained by decoding the encoded image data and decoded image data for the preceding frame obtained by delaying the encoded image data for one frame interval before decoding, it can also avoid the unnecessary application of excessive voltages associated with encoding and decoding errors when a still image is input.

Patent document 1: Japanese Patent No. 2616652

Patent document 2: Japanese Patent Application Publication No. 2004-163842

In the image processing circuit for driving a liquid crystal described in patent document 2, however, encoding is carried out by a block coding scheme that attempts to maintain a constant amount of quantized image data in the encoded image data, regardless of the type of input image, so when the coding compression ratio is increased to reduce the amount of coded data, the error due to coding and decoding increases, which has a major effect on the corrected image data. The problem accordingly arises that when the coding compression ratio is increased to reduce the amount of coded data, unnecessary excessive voltages are applied to the liquid crystal.

SUMMARY OF THE INVENTION

The present invention addresses the above problem with the object, in a liquid-crystal-driving image processing circuit that encodes and decodes image data to reduce the frame memory size, of providing a liquid-crystal-driving image processing circuit capable of reducing the effect of encoding and decoding errors, correcting image data accurately, and applying appropriately corrected voltages to the liquid crystal.

The present invention provides a liquid-crystal-driving image processing circuit that receives image data corresponding to voltages applied to a liquid crystal, the image data indicating gray-scale values of pixels in an image, corrects the image data according to changes in the gray-scale values of the pixels, and outputs the corrected image data, comprising:

an encoder for compressively encoding the image data representing a current frame of the image block by block, thereby outputting encoded image data corresponding to the image in the current frame;

a first decoder for decoding the encoded image data output by the encoder, thereby outputting first decoded image data corresponding to the image data of the current frame;

a delay circuit for delaying the encoded image data output by the encoder for an interval corresponding to one frame;

a second decoder for decoding the encoded image data output from the delay circuit, thereby outputting second decoded image data corresponding to the image data one frame before the current frame;

a variation calculator for determining variations of the pixels between the first decoded data and the second decoded data;

a preceding-frame image calculator for using the image data of the current frame and said variations to calculate reconstructed image data corresponding to the image data one frame before the current frame; and an image data corrector for correcting the gray-scale values of the image in the current frame on a basis of the image data of the current frame and the reconstructed image data;

wherein the encoder includes a data blocker for dividing the image data into a plurality of non-overlapping unit blocks and outputting block image data, a dynamic range generator for determining a dynamic range of the block image data in each unit block, or in each compound block consisting of a plurality of consecutive blocks, and a mean value generator for outputting, as mean value data, a mean value of the image data in each unit block in the current frame or a mean value of the image data in a compound block including the unit block, on the basis of the dynamic range data.

According to the present invention, when the image data in each block of the current frame are quantized and the encoded image data are output, because the amount by which the number of pixels in the quantized image data in the encoded image data is reduced is adjusted on the basis of the dynamic range of the image data, and either the mean value of the image data in each unit block or the mean value of the image data in a compound block including the unit block is output, when the encoded data size is reduced, the concomitant encoding error is reduced, so the response speed of the liquid crystal can be controlled appropriately without the unnecessary application of excessive voltages due to encoding error effects.

BRIEF DESCRIPTION OF THE DRAWINGS

In the attached drawings:

FIGS. 4(*a*), 4(*b*), and 4(*c*) are further diagrams illustrating the general basics of four-value encoding;

DETAILED DESCRIPTION OF THE INVENTION

First Embodiment

Figure 1:
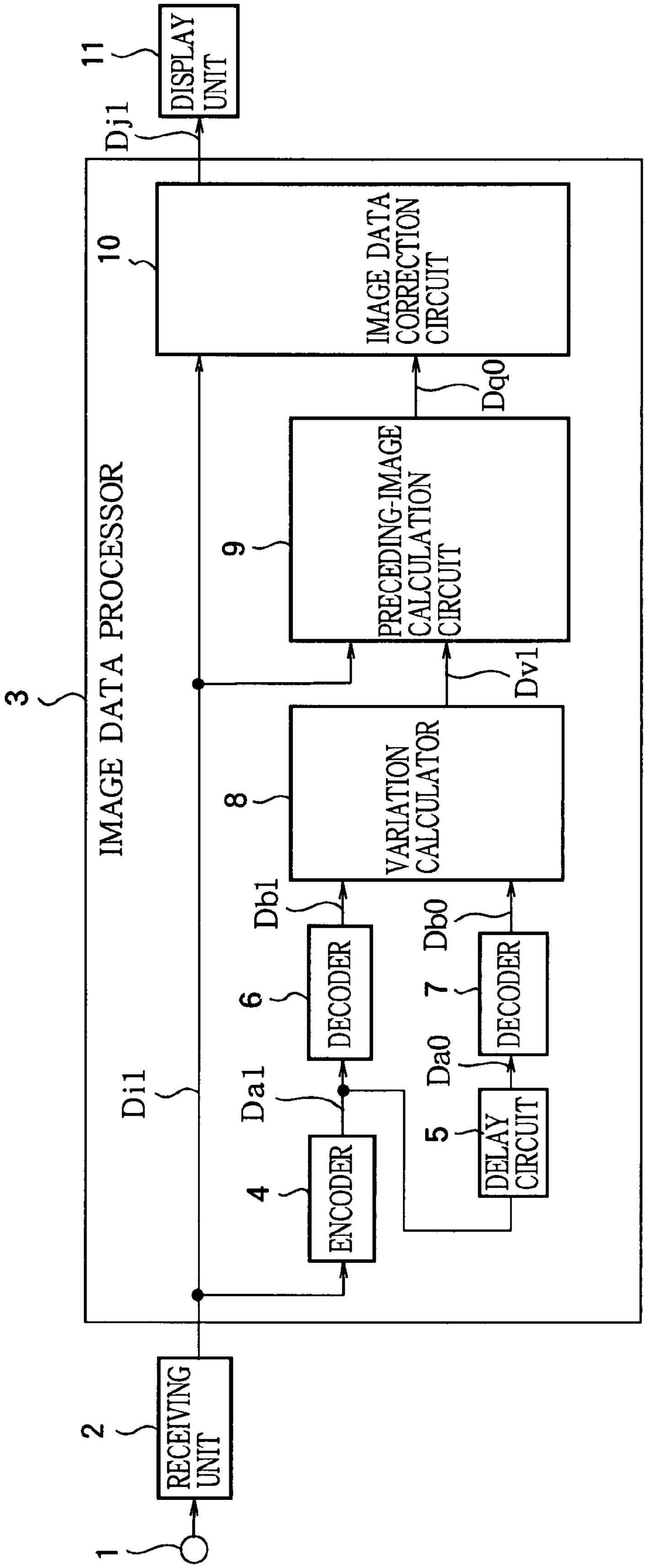
FIG. 1 is a block diagram showing the structure of an image processing apparatus according to a first embodiment.

FIG. 1 is a block diagram showing the structure of a liquid crystal display device provided with image processing apparatus according to a first embodiment of the present invention. This liquid crystal display device has a display unit 11 comprising a liquid crystal panel; the image processing apparatus in this embodiment outputs image data representing gray-scale values of pixels of an image, corresponding to voltages applied to the liquid crystal in the display unit 11, that are corrected on the basis of changes in the gray-scale values of the pixels.

A receiving unit 2 carries out processing including tuning and decoding of a video signal input through an input terminal 1, then sequentially outputs current image data Di1 representing one frame of an image (the image in the current frame) to an image data processor 3.

The image data processor 3 comprises an encoder 4, a delay circuit 5, decoders 6, 7, a variation calculator 8, a preceding-image calculation circuit 9, and an image data correction circuit 10. The image data processor 3 corrects the image data Di1 according to variations in gray-scale values, and outputs the corrected image data Dj1 to a display unit 11.

The display unit 11 applies driving voltages specified by the corrected image data Dj1, thereby displaying the image.

The operation of the image data processor 3 will now be described.

The encoder 4 compressively encodes the current image data Di1 (the image data of the current frame) and outputs encoded image data Da1 corresponding to the current image data.

The encoding method used in the encoder 4 may be any block truncation coding (BTC) method, such as FBTC (fixed block truncation coding) or GBTC (generalized block truncation coding), that determines a mean value and dynamic range for each block of image data and uses these to compressively code each block; non-reversible methods may be used.

As will be described in detail below, the encoder 4 in this embodiment divides an image into a plurality of non-overlapping unit blocks and compressively encodes one group of blocks at a time, where the blocks in the group of blocks or compound block are, for example, a plurality of consecutive unit blocks extending horizontally or vertically in the same screen, and the mean value and amount by which the number of pixels is reduced (decimation ratio) used in encoding the compound block are switched according to the size of the dynamic range in the compound block.

In the specific examples detailed below, the current image data output from the receiving unit 2 comprise a luminance signal Y and color difference signals Cb, Cr. The luminance signal Y and each of the color difference signals Cb, Cr is an eight-bit signal, each compound block consists of two horizontally adjacent unit blocks, and each unit block has a size of four pixels horizontally and two pixels vertically.

The delay circuit 5 delays the encoded image data Da1 for one frame interval, thereby outputting the encoded image data Da0 of the preceding frame. The higher the encoding ratio (data compression ratio) of the image data Di1 in the encoder 4, the more the memory size of the delay circuit 5 needed to delay the encoded image data Da1 can be reduced.

Decoder 6 decodes the encoded image data Da1 output from the encoder 4, thereby outputting decoded image data Db1 corresponding to the current image data Di1. More specifically, decoder 6 receives the encoded image data Da1, decodes the data according to the mean value and dynamic range in each unit block or compound block and the quantized value of each pixel, and restores the original number of pixels by interpolation, thereby outputting decoded image data Db1 corresponding to the current image data Di1 (first decoded image data corresponding to the image data in the current frame).

Decoding circuit 7 receives the encoded image data Da0 delayed by an interval corresponding to one frame by the delay circuit 5, decodes the data according to the mean value and dynamic range in each unit block or compound block and the quantized value of each pixel, and restores the original number of pixels by interpolation, thereby outputting decoded image data Db0 representing the image in the preceding frame (second decoded image data corresponding to the image data one frame before).

The variation calculator 8 subtracts the decoded image data Db1 corresponding to the image data of the current frame from the decoded image data Db0 corresponding to the image data of the preceding frame to calculate variation data Dv1 for the gray-scale value of each pixel, indicating variation from the image one frame before to the current image. The variation Dv1 is input to the preceding-frame image calculator 9, together with the current image data Di1.

The preceding-frame image calculator 9 adds the variation Dv1 in gray-scale value output from the variation calculator 8 to the current image data Di1 to generate preceding-frame image data Dq0 (reconstructed image data corresponding to the image data one frame before). The preceding-frame image data Dq0 are input to the image data correction circuit 10.

The image data correction circuit 10 corrects the gray-scale values in the image data Di1 in accordance with the changes in the gray-scale values over an interval of one frame, obtained from a comparison of the current image data Di1 with the preceding-frame image data Dq0, so as to cause the liquid crystal to reach the transmittance specified by the image data Di1 within a one-frame interval, and outputs the corrected image data Dj1.

Figure 2:
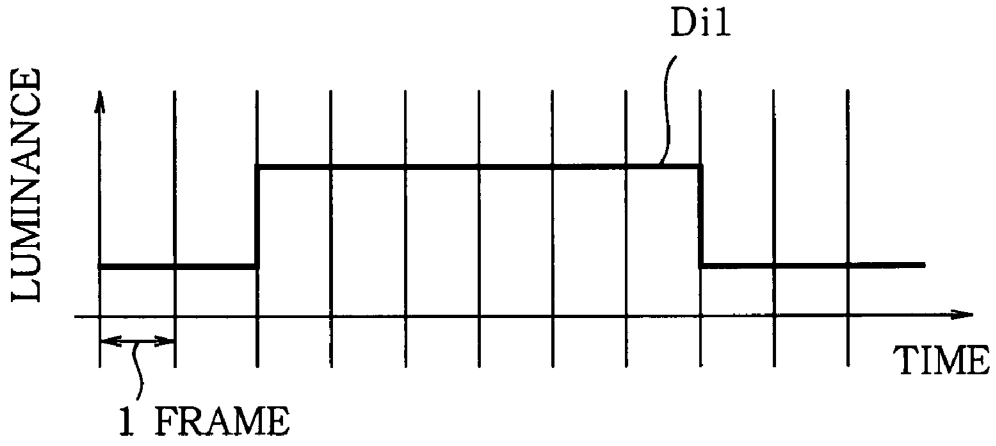
FIGS. 2(*a*), 2(*b*), and 2(*c*) are graphs illustrating response characteristics of the liquid crystal.
Figure 2:
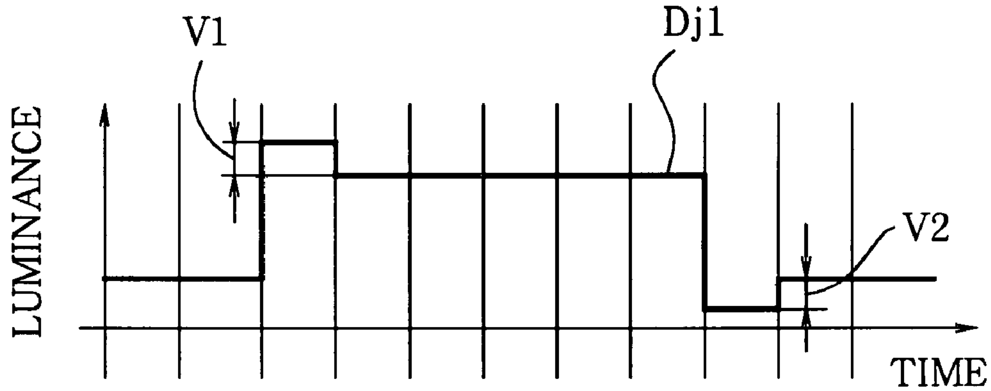
Figure 2:
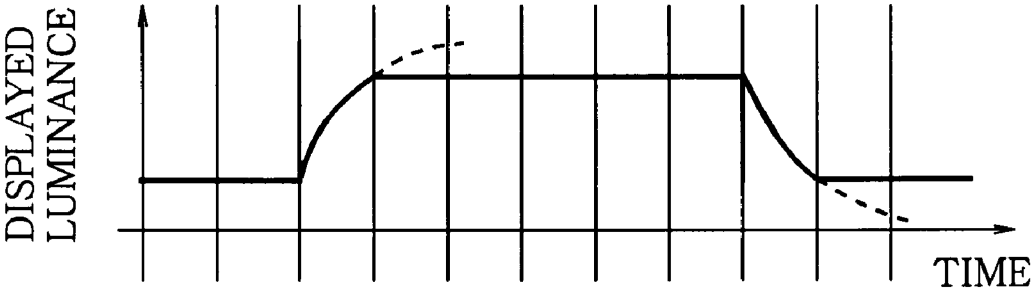

FIGS. 2(*a*), 2(*b*), and 2(*c*) illustrate response characteristics when a driving voltage based on the corrected image data Dj1 is applied to the liquid crystal. FIG. 2(*a*) shows the current image data Di1 output from the receiving unit 2, FIG. 2(*b*) shows the corrected image data Dj1, and the solid line in FIG. 2(*c*) shows the liquid crystal response curve obtained by applying a driving voltage based on image data Dj1. The dashed curves in FIG. 2(*c*) also show the liquid crystal response when a driving voltage is applied according to the current image data Di1 output from the receiving unit 2. When the gray-scale value increases and decreases as shown in FIG. 2(*a*), corrections V1 and V2 are added to and subtracted from the current image data Di1 to generate the corrected image data Dj1 as shown in FIG. 2(*b*). Application of a driving voltage based on the corrected image data Dj1 to the liquid crystal can cause the liquid crystal to reach the transmittance specified by the current image data Di1 within substantially one frame interval, as shown by the solid line in FIG. 2(*c*).

When the image data Di1 output by the receiving unit 2 comprises a luminance signal (Y) and color difference signals (Cb, Cr) as mentioned above, the image data corrector 10 converts its input image data Di1 and Dq0 from a luminance signal (Y) and color difference signals (Cb, Cr) to signals of the three primary colors (red, green, blue) before performing correction processing.

When the image data Di1 comprise signals of the three primary colors (red, green, blue), however, the encoder 4 should convert these signals to a luminance signal and color difference signals before performing encoding processing, and the decoders 6, 7 should convert from luminance and color difference signals to signals of the three primary colors before the variations are calculated.

Thus for a different signal format, at the necessary points, the signal format is converted before the signals are processed.

The general processing method when the encoding performed by the encoder 4 is FBTC will now be explained.

In FBTC, first the image is divided into a plurality of mutually non-overlapping blocks, the mean value and dynamic range of the image data included in each block are determined, and the image data of the pixels in the block are quantized so as to take one of a number of levels (e.g., two levels or four levels), whereby quantized values (quantized pixel data) are obtained. In decoding, representative values corresponding to the quantized values of the levels are calculated on the basis of the mean value and dynamic range, and the representative values are used as the values of the decoded image data of the pixels.

A more detailed description will be given below of the case in which the number of levels after quantization is four, that is, of four-level compressive encoding.

Figure 3:
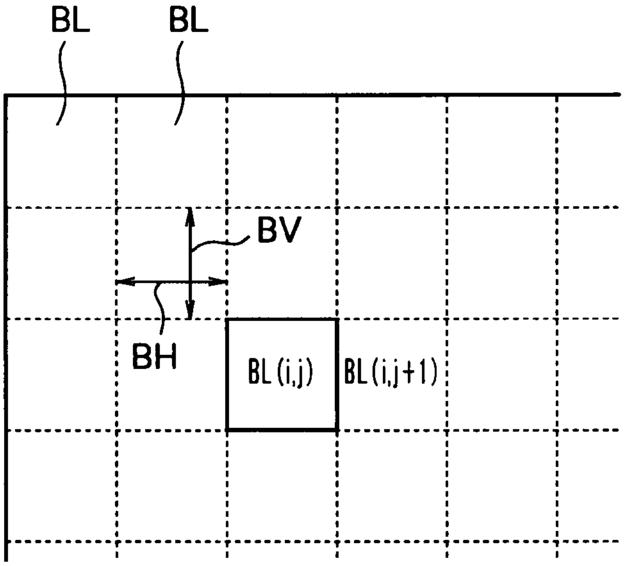
FIGS. 3(*a*), 3(*b*), and 3(*c*) are diagrams illustrating the general basics of four-value encoding.
Figure 3:
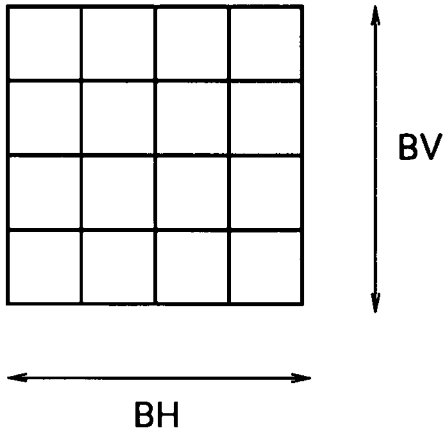
Figure 3:
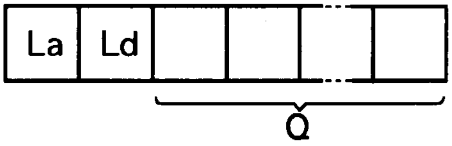

First, as shown in FIG. 3(*a*), the current image data are divided into a plurality of blocks BL (the sections demarcated by the dotted lines). The number of pixels in each block BL is equal to the product of the horizontal number of pixels BH and the vertical number of pixels BV. FIG. 3(*b*) shows the arrangement of pixels in one block obtained as a result of this type of block division.

Next the following processing is performed for each block. First, the maximum pixel signal value MAX and minimum pixel signal value MIN in the block are obtained from the pixel signals in the block.

Next, the following are obtained from the minimum value MIN and maximum value MAX.

$$L1=(3\times MIN+MAX)/4$$

$$L3=(MIN+3\times MAX)/4 \tag{1}$$

The mean value Q1 of the pixel signals in the interval from the minimum value MIN to L1 and the mean value Q4 of the pixel signals in the interval from L3 to the maximum value MAX are also obtained. In addition, from these mean values Q1 and Q4, the dynamic range value $$Ld=Q4-Q1 \tag{2}$$

and the mean value $$La=(Q1+Q4)/2 \tag{3}$$

are obtained.

Finally, the quantization thresholds are obtained.

$$T1=La-Ld/3$$

$$T2=La$$

$$T3=La+Ld/3 \tag{4}$$

The image data of the pixels are then quantized onto four levels by comparison with the threshold values T1, T2, T3 to obtain the quantized value Q of each pixel. The mean value La, dynamic range Ld, and quantized values Q obtained by these processes are combined as shown in FIG. 3(*c*) to form the encoded data.

In decoding, a conversion process is carried out by calculation or by use of a conversion table, based on the quantized values Q, dynamic range Ld, and mean value La, to obtain the decoded data DQ. The decoded data DQ take one of the four representative values mentioned above. The four representative values are given by the following formulas:

$$D1=La-Ld/2,$$

$$D2=La-Ld/6,$$

$$D3=La+Ld/6, \text{ and}$$

$$D4=La+Ld/2 \tag{5}.$$

In other words, the four-valued pixel values are converted to the above representative values to obtain the reconstructed value (representative value) RD of each pixel. If the quantized pixel signals take one of the four values 0, 1, 2, and 3, then the values of the reconstructed pixel signals are given by the following formula.

$$RD=La+(2\times Q-1)\times Ld/6 \tag{6}$$

For example, consider the pixel data shown in FIG. 4(*a*), where BH=4 and BV=4. In FIG. 4(*a*), the maximum value MAX is 240, the minimum value MIN is 10, L1=(3×MIN+MAX)/4 is 67, and L3=(MIN+3×MAX)/4 is 182. Furthermore, mean value Q1 is 40, mean value Q4 is 210, the dynamic range Ld is q4−Q1=170, and the mean value La is (Q1+Q4)/2=125. Finally, the quantization thresholds are T1=La−Ld/3=69, T2=La=125, and T3=La+Ld/3=181. The quantized values after compressive coding of this block are shown in FIG. 4(*b*). After quantization, the quantized value of both pixels with pixel data 10 and pixels with pixel data 50 is 00, the quantized value of pixels with pixel data 100 is 01, the quantized value of pixels with pixel data 150 is 10, and the quantized value of pixels with pixel data 200 or 240 is 11. The representative values are D1=La−Ld/2=40, D2=La−Ld/6=99, D3=La+Ld/6=151, and D4=La+Ld/2=210.

When the decoding process is performed on the quantized values after the compressive encoding shown in FIG. 4(*b*), decoded image data having the values shown in FIG. 4(*c*) are obtained.

When the image data to be coded comprise a luminance signal Y and color difference signals Cb and Cr, the above processing is carried out on the luminance signal Y and each of the color difference signals Cb, Cr.

Next, the structure and operation of the encoder 4 in the present embodiment will be described.

Figure 5:
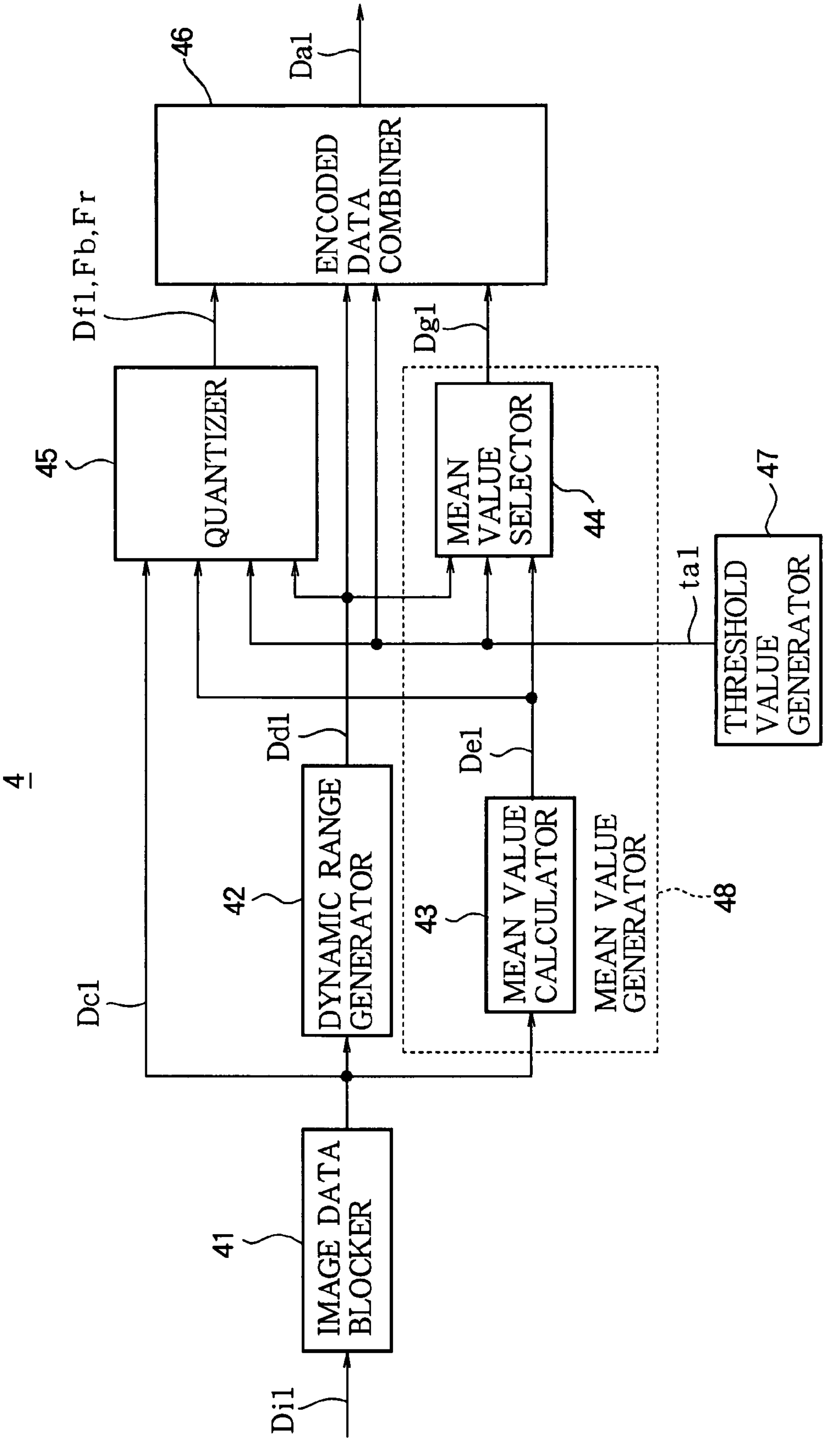
FIG. 5 illustrates the internal structure of the encoder in the first embodiment.

FIG. 5 is a block diagram showing the internal structure of the encoder 4. The encoder 4 comprises an image data blocker 41, a dynamic range generator 42, a mean value calculator 43, a mean value selector 44, a quantizer 45, an encoded data combiner 46, and a threshold value generator 47. The mean value calculator 43 and mean value selector 44 constitute a mean value generator 48.

The image data blocker 41 divides the current image data Di1 into non-overlapping rectangular unit blocks, each including BH×BV pixels, and outputs block image data Dc1. The value of each pixel in the block image data Dc1 is the same as its value in the image data Di1 output from the receiving unit 2, but the block image data Dc1 differ from the input image data Dc1 in being organized into unit blocks. A unit block is a block like block BL in FIG. 3(*a*). In the description below, the units blocks have a horizontal width BH of four pixels and a vertical height BV of two pixels. Two horizontally adjacent (consecutive) blocks such as block BL(i, j) and block BL(i, j+1) in FIG. 3(*a*) constitute a compound block and are processed together.

Figure 6:
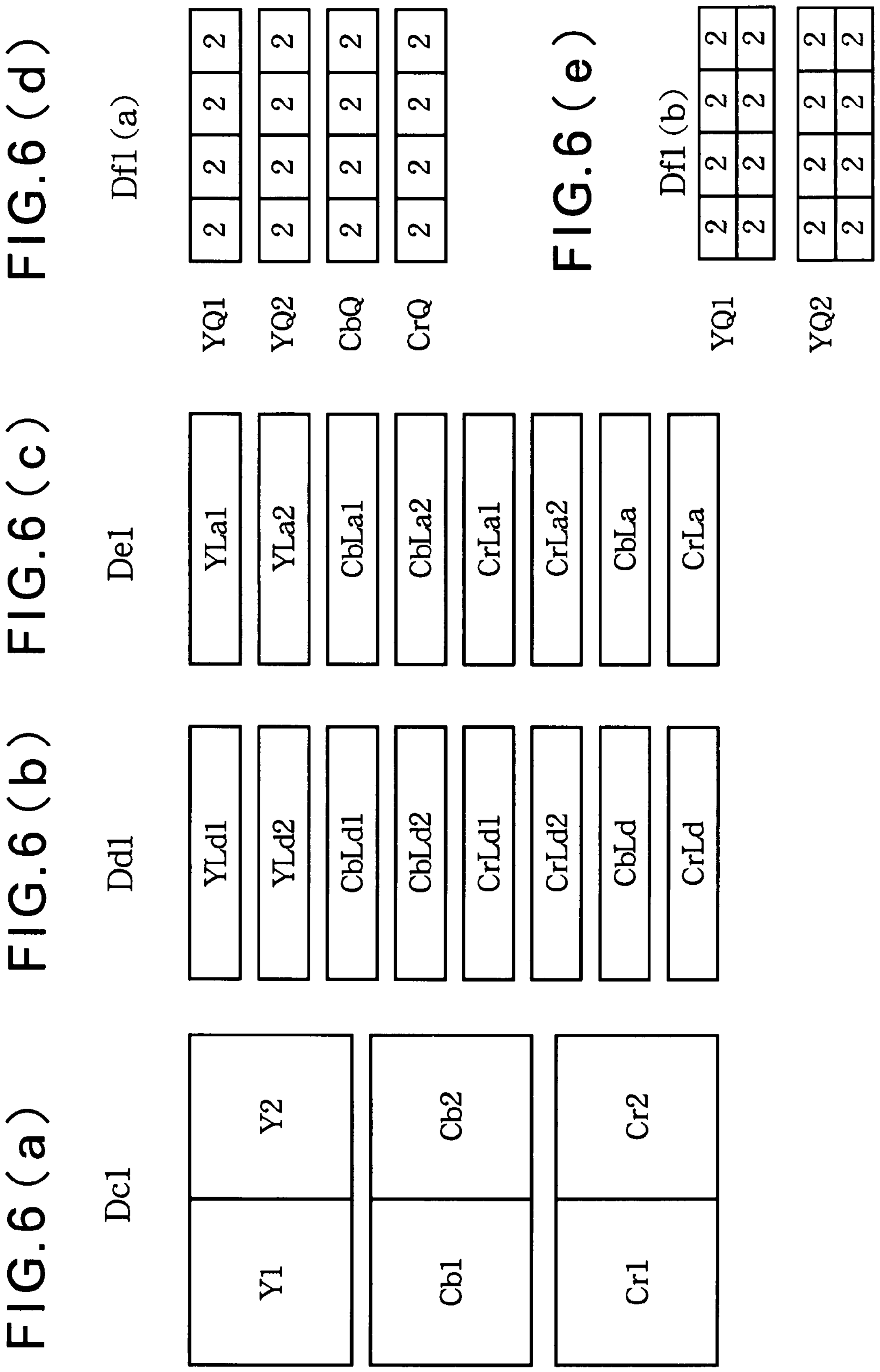
FIGS. 6(*a*), 6(*b*), 6(*c*), 6(*d*), and 6(*e*) illustrate the operation of the encoder in the first embodiment.

FIG. 6(*a*) illustrates the luminance signals Y1, Y2 and color difference signals Cb1, Cb2, Cr1, Cr2 in the two unit blocks (the first unit block and the second unit block) constituting one compound block in the input image data Di1.

As indicated in FIG. 6(*b*), the dynamic range generator 42 determines the dynamic ranges YLd1, YLd2 of the luminance signals Y in the two unit blocks in each compound block, the dynamic ranges CbLd1, CbLd2, CrLd1, CrLd2 of the color difference signals Cb, Cr in the two unit blocks in each compound block, and the dynamic ranges CbLd, CrLd of the color signals Cb, Cr in each of the compound blocks (the dynamic ranges across the two unit blocks constituting the compound block). The set of data including dynamic ranges YLd1, YLd2, CbLd, and CrLd will be referred to as the dynamic range data Dd1.

The dynamic ranges YLd1, YLd2, CbLd1, CbLd2, CrLd1, CrLd2, CbLd, CrLd are determined from equation (2) above.

From the luminance signals Y1, Y2 and color difference signals Cb1, Cb2, Cr1, Cr2 in the two unit blocks constituting a compound block and output as block data Dc1 by the image data blocker 41, the mean value calculator 43 calculates the mean values of the unit blocks and the mean value of the compound block, that is, the mean value across the two unit blocks constituting the compound block. Specifically, it calculates the mean values YLa1, YLa2 of the luminance signals Y1, Y2 in the unit blocks, the mean values CbLa1, CbLa2 of the color difference signals Cb1, Cb2 in the two unit blocks, the mean values CrLa1, CrLa2 of the color difference signals Cr1, Cr2 in the two unit blocks, the mean value CbLa of the color difference signal Cb across the two unit blocks, and the mean value CrLa of the color difference signal Cr across the two unit blocks.

These mean values YLa1, YLa2, CbLa1, CbLa2, CrLa1, CrLa2, CbLa, CrLa are calculated according to the equation (3) given above.

In this embodiment, the dynamic ranges YLd1, YLd2, CbLd1, CbLd2, CrLd1, CrLd2, CbLd, CrLd and mean values YLa1, YLa2, CbLa1, CbLa2, CrLa1, CrLa2, CbLa, CrLa are expressed by eight-bit data.

The threshold value generator 47 generates a threshold value ta1 with which the dynamic range data Dd1 are compared.

The quantizer 45 quantizes the pixel data in each block of image data Dc1 and outputs the quantized data Df1. Quantized data Df1 are generated for both the luminance signals and color difference signals. When certain conditions are satisfied, the data are decimated to reduce the number of pixels and the quantized data Df1 are generated for only the reduced number of pixels. Specifically, (A) when at least one of the two dynamic ranges CbLd, CrLd of the two color difference signals Cb, Cr in a compound block (the dynamic ranges CbLd, CrLd of the color difference signals Cb, Cr across the two unit blocks constituting the compound block being processed) is greater than the predetermined threshold value ta1, (A1) the luminance signal in each unit block is decimated to reduce the number of pixels in the unit block to one-half the original number, and quantized luminance signal values YQ1, YQ2 are determined for the reduced number of pixels, and (A2) similarly, the color difference signals in each unit block are decimated to reduce the number of pixels in the unit block to one-fourth the original number, and quantized luminance signal values CbQ, CrQ are determined for the reduced number of pixels, and (B) when both of the dynamic ranges CbLd, CrLd of the color difference signals Cb, Cr in the compound block are equal to or less than the predetermined threshold value ta1, (B1) the luminance signals in the unit blocks are not decimated, and quantized luminance signal values YQ1, YQ2 are determined for the full number of pixels, and (B2) the color difference signals in each unit block are decimated by a higher ratio than when condition (A) holds, e.g. essentially to one pixel, so that no quantized color difference signals are output for the compound block (the number of quantized values is zero; the pixel value of the one pixel is equal to the mean value, so there is no need to store quantized values.

In this embodiment, regardless of whether the dynamic ranges CbLd, CrLd of the two color difference signals Cb, Cr in the compound block are greater than the predetermined threshold value ta1, the mean values YLa1, YLa2 of the luminance signal Y in the two unit blocks are determined and used as the mean values of the unit blocks, and dynamic range data YLd1' and YLd2' with reduced numbers of bits are calculated for the luminance signal in each unit block.

The quantizer 45 also generates one-bit flag data Fb, Fr indicating whether each of the dynamic ranges CbLd, CbLd is greater than the threshold value ta1. Flag Fb is set to '1' if dynamic range CbLd is greater than the switchover threshold ta1, and to '0' if dynamic range CbLd is less than the switchover threshold ta1. Flag Fr is set to '1' if dynamic range CrLd is greater than the switchover threshold ta1, and to '0' if dynamic range CrLd is less than the switchover threshold ta1.

The generated flags Fb, Fr are output together with the bit-reduced dynamic range data YLd1', YLd2'. The reason for reducing the number of bits of dynamic range data YLd1, YLd2 is so that after the bit reduction, these data and the one-bit Fb, Fr data will combine to form one-byte data.

Figure 7:
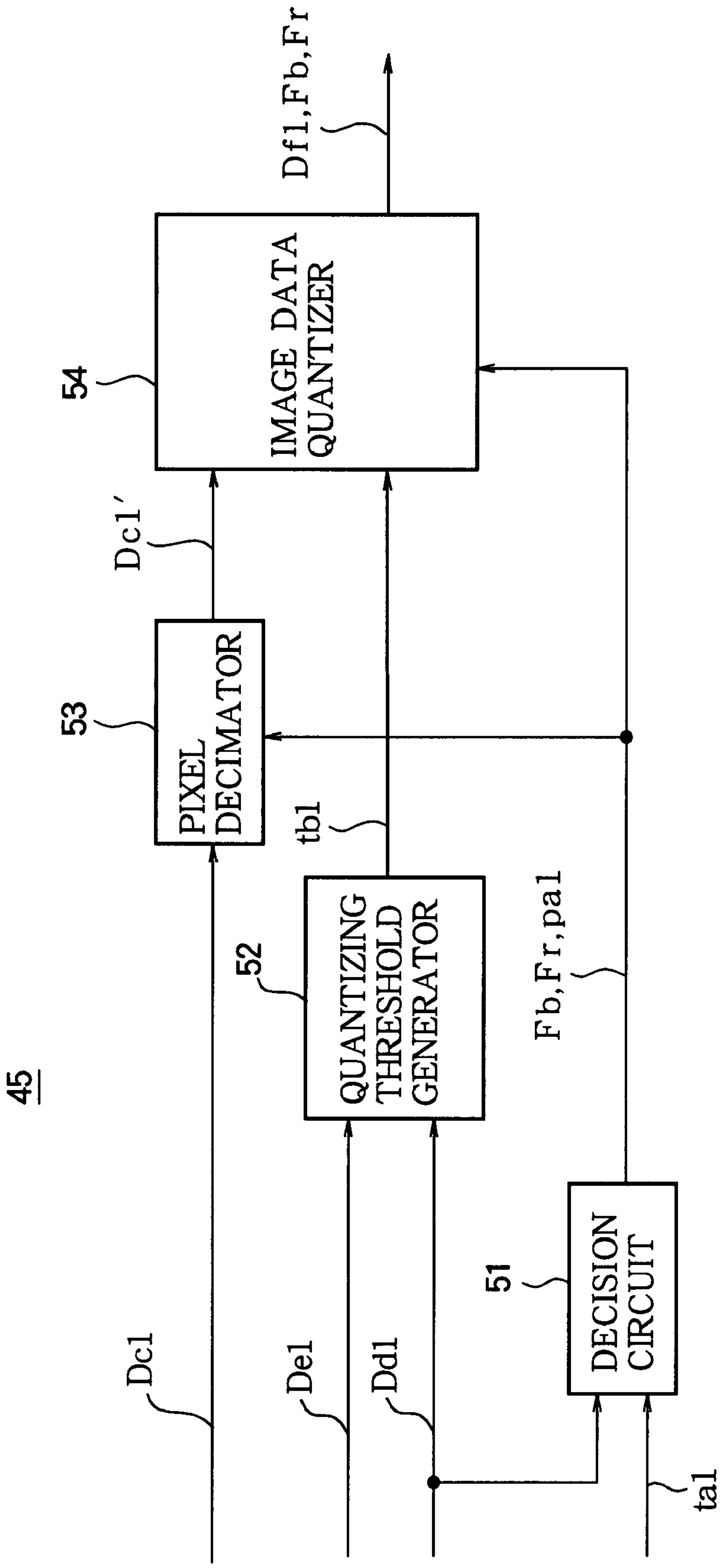
FIG. 7 illustrates the internal structure of the quantizer in the first embodiment.

FIG. 7 shows the internal structure of the quantizer 45. The quantizer 45 comprises a decision circuit 51, a quantizing threshold generator 52, a pixel decimator 53, and an image data quantizer 54.

The threshold value ta1 generated by the threshold value generator 47 in FIG. 5 is input to the decision circuit 51. The decision circuit 51 outputs decision flags Fb, Fr, and pal on the basis of the results of comparisons of the dynamic ranges CbLd, CrLd with the switchover threshold ta1. If dynamic range CbLd is greater than ta1, then Fb=1, and if not, then Fb=0. If dynamic range CrLd is greater than ta1, then Fr=1, and if not, then Fr=0. If at least one of dynamic ranges CbLd and CrLd is greater than ta1, then pa1=1, and if not, then pa1=0.

From the dynamic range Dd1 and mean value De1 of each unit block, the quantizing threshold generator 52 outputs quantization threshold value data tb1 used in quantizing the block image data Dc1. The quantization threshold value data tb1 indicate a number of thresholds one less than the number of quantization levels. The quantized values of the luminance signal Y and color difference signals Cb, Cr are determined according to equation (4). Specifically, the quantized value of the luminance signal Y is determined on the basis of the dynamic ranges YLd1, YLd2 and the mean values YLa1, YLa2 of the luminance signal Y in each unit block, the quantized value of color difference signal Cb is determined on the basis of the dynamic ranges CbLd1, CbLd2 and the mean values CbLa1, CbLa2 of color difference signal Cb in each unit block, and the quantized value of color difference signal Cr is determined on the basis of the dynamic ranges CrLd1, CrLd2 and the mean values CrLa1, CrLa2 of color difference signal Cr in each unit block.

On the basis of decision flag pal, the pixel decimator 53 reduces the number of pixels in the block image data Dc1 and outputs pixel-reduced block image data Dc1' with a smaller number of pixels than the block image data Dc1.

Specifically, when pa1=1 (the number of pixels is reduced by half, as will be described in more detail below with reference to FIGS. 8(*b*) and 9(*b*)), the number of luminance pixels is reduced to half of the original number, reducing the 4×2 pixels of a unit block (BH=4, BV=2) to 4×1 pixels, and the number of color difference pixels is reduced to one-fourth the original number, reducing the 8×2 pixels in two unit blocks (BH=8, BV=2) to 4×1 pixels.

When pa1=0, the number of luminance pixels is not reduced, that is, the original 4×2 pixels of each unit block are left as is, and the number of color difference pixels in each unit block is reduced to essentially one. A general digital filter such as a mean-value filter can be used for the above process of reducing the number of pixels.

By the processing above, the pixel decimator 53 sends the image data quantizer 54 image data Dc1' in which the number of pixels in the luminance signal and color difference signals is reduced or not reduced according to the value of decision flag pa1.

When the dynamic range data Dd1, more specifically, the dynamic ranges CbLd, CrLd of the color difference signals in two unit blocks, are comparatively large, since reducing the number of pixels in the color difference signals would cause large error effects, the pixel decimator 53 reduces the number of pixels in the color difference signals by a comparatively small amount, and reduces the number of pixels in the luminance signals by a comparatively large amount (for example, by half), as explained above, while when the dynamic range data Dd1 of the block image data Dc1, more specifically, the dynamic ranges CbLd, CrLd of the color difference signals in two unit blocks, are comparatively small, since reducing the number of pixels in the color difference signals causes only small error effects, the pixel decimator 53 reduces the number of pixels in the color difference signals by a comparatively large amount, and reduces the number of pixels in the luminance signals by a comparatively small amount (for example, by zero, that is, by not reducing the number of pixels at all), whereby, since the number of pixels by which the unit block image data Dc1 is reduced is adjusted according to the dynamic range, the amount of encoded data Da1 can be reduced while minimizing the encoding error.

The image data quantizer 54 uses the plurality of threshold values expressed by the quantization threshold data tb1 output by the quantizing threshold generator 52 to quantize the image data Dc1' with the reduced number of pixels, and outputs the quantized image data Df1, the structure of the quantized image data Df1 depends on the image data Dc1' that have undergone pixel reduction in the pixel decimator 53: when at least one of the dynamic ranges CbLd and CrLd is greater than the switchover threshold value ta1 (when pa1 is '1'), the encoded data Df1(*a*) indicated in FIG. 6(*d*) as YQ1, YQ2, CbQ, and CrQ are output as the quantized image data Df1; when both dynamic ranges CbLd and CrLd are equal to or less than the switchover threshold value ta1 (when pal is '0'), the encoded data Df1(*b*) indicated in FIG. 6(*e*) as YQ1, YQ2 are output. The number '2' in the data Df1(*a*) and Df1(*b*) in FIGS. 6(*d*) and 6(*e*) indicates the number of bits per pixel after quantization, but the number of bits per pixel is not limited to '2'; any number of bits may be selected. The compression ratio of the image data is determined by this number of bits.

The quantized image data Df1 output by the image data quantizer 54 are output from the quantizer 45 together with the flags Fb, Fr, and are input to the encoded data combiner 46.

Referring once more to FIG. 5, the switchover threshold value ta1 output by the threshold value generator 47 is also input to the mean value selector 44. The mean value selector 44 compares the dynamic range data Dd1, more specifically, the dynamic ranges CbLd, CrLd of the color difference signals in the compound block, with the switchover threshold value ta1, and selects and outputs, for each compound block, either the mean values CbLa, CrLa of the compound block or the mean values CbLa1, CbLa2, CrLa1, CrLa2 of each unit block in the compound block. The selected mean value data will be denoted Dg1.

Specifically, when the dynamic range data Dd1, more specifically at least one of the dynamic ranges CbLd, CrLd of the color difference signals in the compound block, exceed the switchover threshold ta1, the mean values CbLa, CrLa of the color difference signals in the compound block are selected from among the mean values of the color difference signals output by the mean value calculator 43, and the selected mean values are output to the encoded data combiner 46 as the mean value data Dg1.

When both of the dynamic ranges CbLd, CrLd of the color difference signals in the compound block are less than the switchover threshold value ta1, the mean values CbLa1, CbLa2, CrLa1, CrLa2 of each unit block in the compound block are selected from among the mean values of the color difference signals output by the mean value calculator 43, and the selected mean values are output to the encoded data combiner 46 as the mean value data Dg1.

Thus, based on the dynamic ranges CbLd, CrLd of the color difference signals in the compound blocks, the mean value generator 48 comprising the mean value calculator 43 and mean value selector 44 selects either the mean values of the color difference signals of the compound blocks or the mean values of each of the unit blocks making up the compound blocks, and outputs them as the selected mean value data.

In this embodiment, the mean values YLa1, YLa2 in each unit block are output as the mean values of the luminance signal, regardless of the sizes of the dynamic ranges of the color difference signals.

The encoded data combiner 46 combines the quantized image data Df1 and flags Fb, Fr output by the quantizer 45, the dynamic range data Dd1 output by the dynamic range generator 42, and the mean value data Dg1 selected by the mean value selector 44 and outputs them as the encoded image data Da1.

In the combination process, the least significant bit of the dynamic range data YLd1, YLd2 of the luminance signal is removed to reduce the number of bits and generate seven-bit dynamic range data YLd1', YLd2', which are concatenated with the one-bit flags Fb, Fr, so that after concatenation, the number of bits is eight.

The combining process in the encoded data combiner 46 will be described with reference to FIGS. 8(*a*), 8(*b*), 9(*a*), and 9(*b*).

Figure 8A:
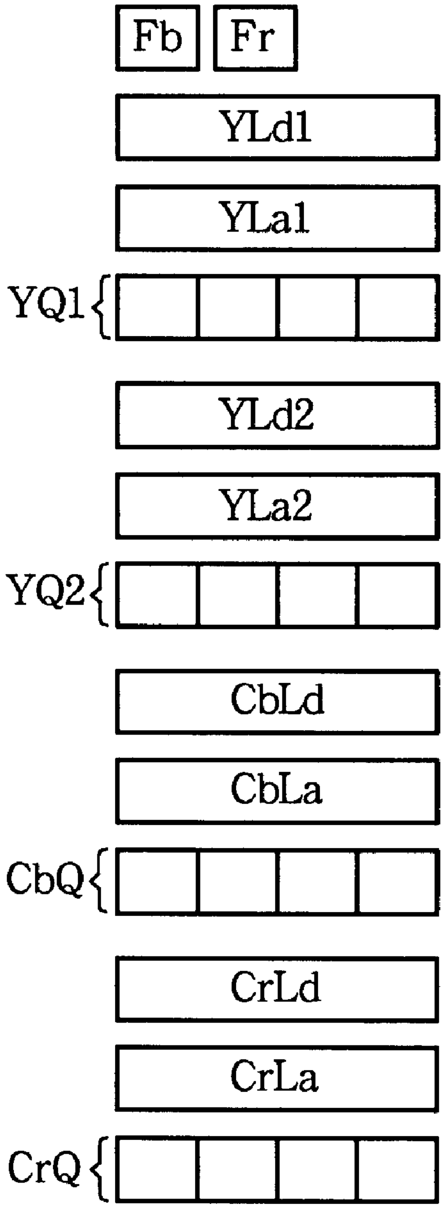
FIGS. 8(*a*) and 8(*b*) illustrate the operation of the encoder in the first embodiment.
Figure 8B:
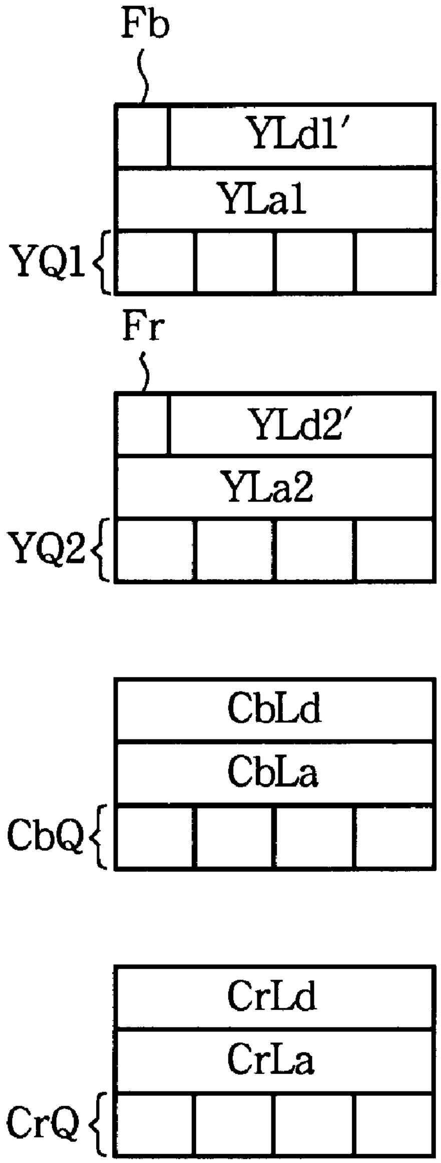

FIGS. 8(*a*) and 8(*b*) show the data input and output by the encoded data combiner 46 when at least one of the dynamic ranges CbLd and CrLd is greater than the switchover threshold value ta1; FIG. 8(*a*) shows input and FIG. 8(*b*) shows output.

As shown in FIG. 8(*a*), from the quantizer 45, the quantized data YQ1, YQ2, CbQ, CrQ with reduced numbers of pixels are supplied as the quantized data Df1 and the flags Fb, Fr are supplied as well; the dynamic ranges Y1D1, Y1D2 of the luminance signal in each unit block and the dynamic ranges CbLd, CrLd of the color difference signals Cb, Cr in the compound block are included in the dynamic range data Dd1 supplied from the dynamic range generator 42, and the mean values YLa1, YLa2 of the luminance signal in each unit block and the mean values CbLa, CrLa of the color difference signals in the compound block are included in the selected mean value data Dg1 supplied from the mean value selector 44.

As shown in FIG. 8(*b*), the flags Fb, Fr (the value of at least one of which is '1'), the dynamic ranges YLd1', YLd2', with reduced numbers of bits, of the luminance signal in each unit block, the mean values YLa1, YLa2 of the luminance signal in each unit block, the quantized values YQ1, YQ2 of the luminance signal with the reduced numbers of pixels, the dynamic ranges CbLd, CrLd of the color difference signals in two unit blocks, the mean values CbLa, CrLa of the color difference signals in the compound block, and the quantized values CbQ, CrQ of the color difference signals are included in the encoded image data Da1 output from the encoded data combiner 46.

Of these, dynamic range YLd1', mean value YLa1, and quantized values YQ1 are the results of encoding the luminance signal (Y1 in FIG. 6(*a*)) in the first unit block, and dynamic range YLd2', mean value YLa2, and quantized values YQ2 are the results of encoding the luminance signal (Y2 in FIG. 6(*a*)) in the second unit block.

Dynamic ranges CbLd, CrLd, mean values CbLa, CrLa, and quantized data CbQ, CrQ are the results of encoding the color difference signals (Cb1, Cb2, Cr1, Cr2 in FIG. 6(*a*)) in the compound block.

Figure 9A:
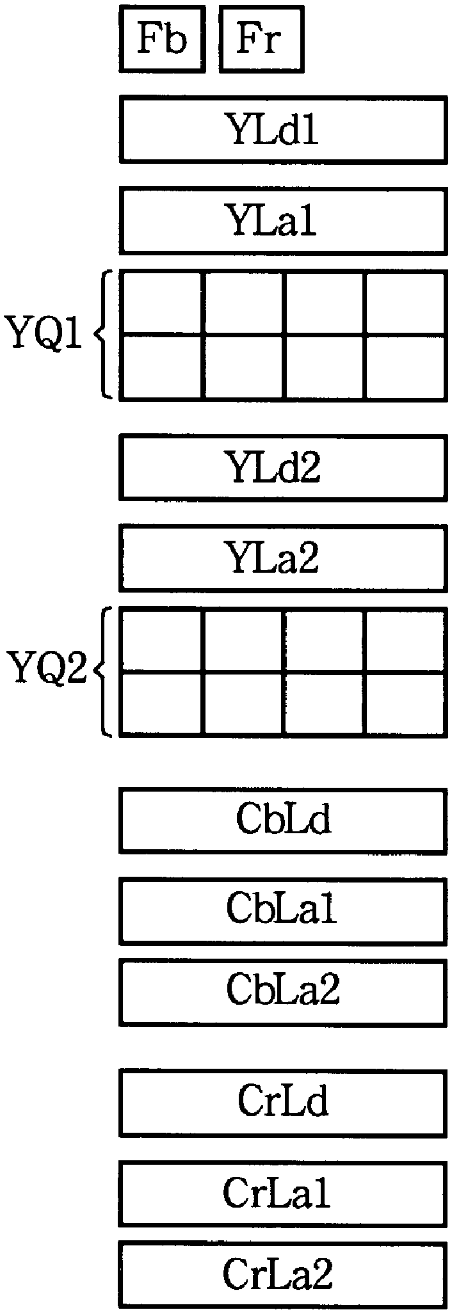
FIGS. 9(*a*) and 9(*b*) illustrate the operation of the encoder in the first embodiment.
Figure 9B:
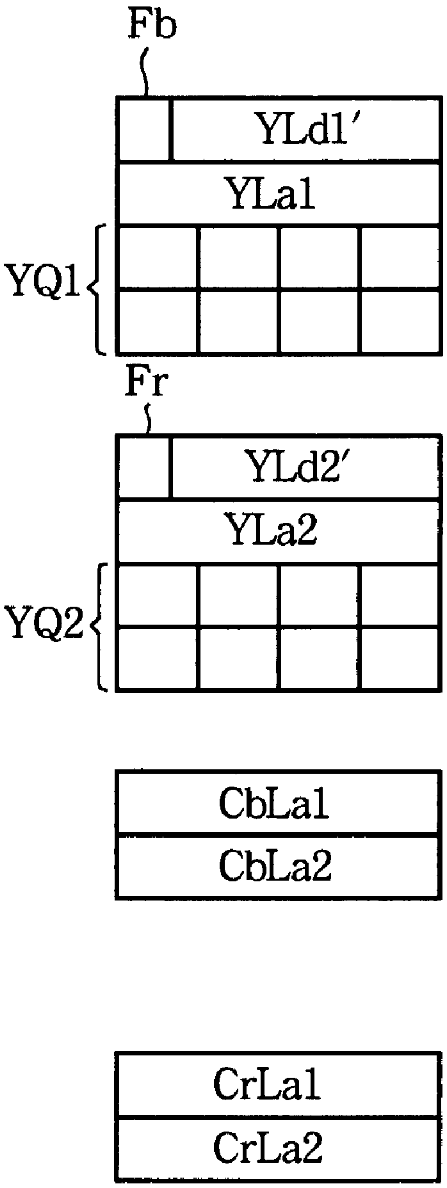

FIGS. 9(*a*) and 9(*b*) show the data input and output by the encoded data combiner 46 when both dynamic ranges CbLd and CrLd are less than the switchover threshold value ta1; FIG. 9(*a*) shows input and FIG. 9(*b*) shows output.

As shown in FIG. 9(*a*), from the f45, the quantized data YQ1, YQ2 with reduced numbers of pixels are supplied as the quantized data Df1 and the flags Fb, Fr are supplied as well, the dynamic ranges Y1D1, Y1D2 of the luminance signal in each unit block and the dynamic ranges CbLd, CrLd of the color difference signals Cb, Cr in the compound block are included in the dynamic range data Dd1 supplied from the dynamic range generator 42, and the mean values YLa1, YLa2 of the luminance signal in each unit block and the mean values CbLa1, CbLa2, Cra1, CrLa2 of the color difference signals in each unit block are included in the selected mean value data Dg1 supplied from the mean value selector 44.

As shown in FIG. 9(*b*), the flags Fb, Fr (the values of both of which are '1'), the dynamic ranges YLd1', YLd2' of the luminance signal with reduced numbers of bits in each unit block, the mean values YLa1, YLa2 of the luminance signal in each unit block, the quantized values YQ1, YQ2 of the luminance signal with unreduced numbers of pixels, and the mean values CbLa1, CbLa2, ,CrLa1, CrLa2 of the color difference signals in the compound block are included in the encoded image data Da1 output from the encoded data combiner 46. Of the data input by the encoded data combiner 46, the dynamic ranges CbLd, CrLd of the color difference signals Cb, Cr in the compound block are not used in making the combination.

Among the data output from the encoded data combiner 46, dynamic range YLd1', mean value YLa1, and quantized values YQ1 are the results of encoding the luminance signal (Y1 in FIG. 6(*a*)) in the first unit block, and dynamic range YLd2', mean value YLa2, and quantized values YQ2 are the results of encoding the luminance signal (Y2 in FIG. 6(*a*)) in the second unit block.

Mean values CbLa1, CrLa1 are the results of encoding the color difference signals (Cb1, Cr1 in FIG. 6(*a*)) in the first unit block, and mean values CbLa2, CrLa2 are the results of encoding the color difference signals (Cb2, Cr2 in FIG. 6(*a*)) in the second unit block.

The sets of data shown in FIGS. 8(*b*) and 9(*b*) are arranged in a particular order when output from the encoder 4, with the flags Fb, Fr being disposed at a fixed position in the data set. For example, flag Fb and dynamic range data YLd1' are placed in the first byte of the data set, flag Fr and dynamic range data YLd2' are placed in the second byte of the data set, and the flags Fb, Fr are placed at the leading positions in these bytes. During decoding, it is accordingly possible to refer to the flags Fb, Fr and learn from them what the data placed in each of the parts represent.

If the luminance signals Y1, Y2 and color difference signals Cb1, Cb2, Cr1, Cr2 in the image data Di1 input to the encoder 4 (FIG. 6(*a*)) are expressed by eight bits of data per pixel, then the total amount of image data for two unit blocks before encoding is 384 bits.

In the encoded image data Da1 shown in FIG. 8(*b*), if the flags Fb, Fr are expressed by one bit apiece, the bit-reduced dynamic range data YLd1', YLd2' are expressed by seven bits apiece, the mean values YLa1, YLa2 of the unit blocks of the luminance signal are expressed by eight bits apiece, the dynamic ranges CbLd, CrLd of the two unit blocks of the color difference signals are expressed by eight bits apiece, the mean values CbLa, CrLa of the two unit blocks of the color difference signals are expressed by eight bits apiece, the quantized values YQ1, YQ2 of the 4×1×2 pixels of the luminance signal with the reduced number of pixels are expressed by two bits apiece, and the quantized values CbQ, CrQ of the 4×1×2 pixels of the color difference signals with the reduced number of pixels are expressed by two bits apiece, then all the image data for two unit blocks is expressed after encoding by 96 bits; the amount of data has been compressed to one-fourth its original size.

Similarly, in the encoded image data Da1 shown in FIG. 9(*b*), if the flags Fb, Fr are expressed by one bit apiece, the dynamic range data YLd1', YLd2' with a reduced numbers of bits are expressed by seven bits apiece, the mean values YLa1, YLa2 of the unit blocks of the luminance signal are expressed by eight bits apiece, the mean values CbLa1, CbLa2, CrLa1, CrLa2 of the color difference signals in each unit block are expressed by eight bits apiece, and the quantized values YQ1, YQ2 of the 4×2×2 pixels of the luminance signal with the unreduced number of pixels are expressed by two bits apiece, then in this case as well, all the image data for two unit blocks is expressed after encoding by 96 bits; the amount of data has been compressed to one-fourth its original size.

By reducing the number of pixels in the pixel decimator 53 and selecting the data to be used for combining in the encoded data combiner 46, the amount of compressively encoded data per compound block is accordingly made the same in FIG. 8(*b*) (when at least one of the dynamic ranges of the color difference signals Cb, Cr is greater than the threshold value) and in FIG. 9(*b*) (when both of the dynamic ranges of the color difference signals Cb, Cr are equal to r less than the threshold value).

The image data Da1 encoded as above are input to decoder 6 and the delay circuit 5.

Figure 10:
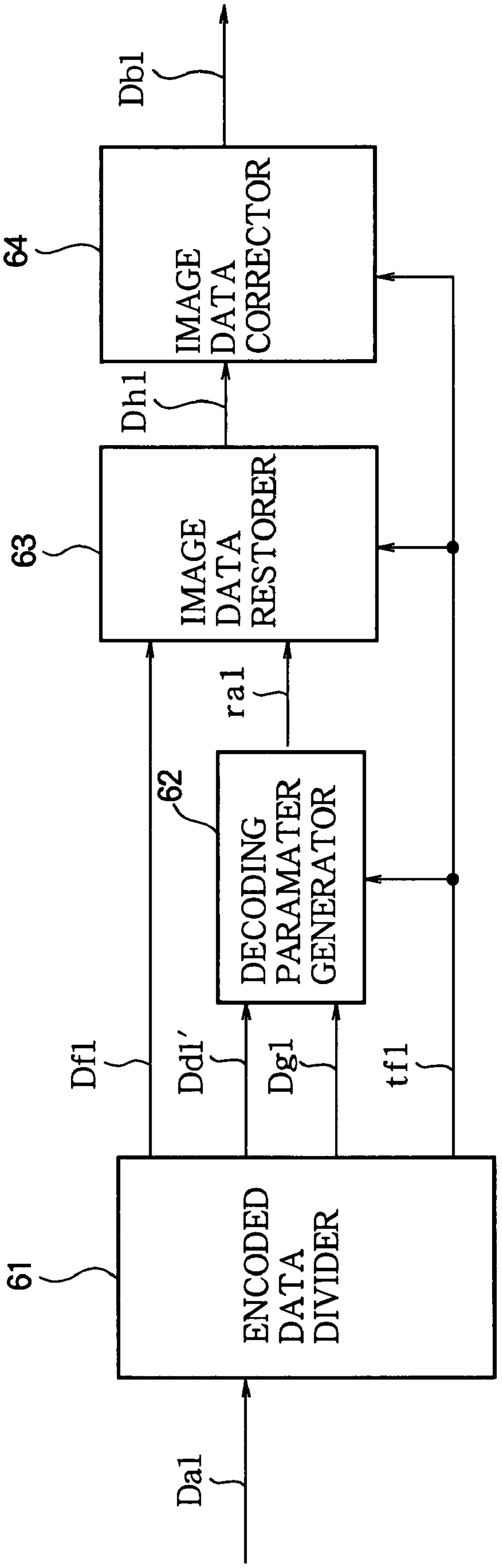
FIG. 10 illustrates the internal structure of the decoders in the first embodiment.

Next, the structure and operation of the decoders 6 and 7 will be described. FIG. 10 is a block diagram showing the internal structure of decoder 6. Decoder 7 has the same structure as decoder 6, but receives image data Da0 instead of image data Da1 as its input signal, and outputs image data Db0 instead of Db1 as its output signal. Although decoder 6 will be described below, the description below also applies, with a change of the input and output signals, to decoder 7.

Decoder 6 comprises an encoded data divider 61, a decoding parameter generator 62, an image data restorer 63, and an image data corrector 64.

The encoded image data Da1 shown in FIG. 8(*b*) or 9(*b*), which are output from the encoder 4, are input to the encoded data divider 61 in decoder 6.

The encoded data divider 61 detects the flags Fb, Fr included in the encoded image data Da1, decides that the input encoded image data Da1 are configured as shown in FIG. 8(*b*) if at least one of the flags is ‘1’ or decides that the input encoded image data Da1 are configured as shown in FIG. 9(*b*) if both of the flags are ‘0’, and divides the encoded image data Da1 according to the result of this decision.

The encoded data divider 61 also outputs a flag tf1 that is set to ‘1’ if at least one of flags Fb, Fr is ‘1’, and to ‘0’ if flags Fb, Fr are both ‘0’.

For each compound block, flag tf1 has the same value as the flag pa1 generated in the encoder 4 for the same compound block.

The decoding parameter generator 62 refers to flag tf1, and generates and outputs decoding parameters ra1.

For that purpose, first it adds least significant bits to the dynamic range data YLd1' and YLd2' of the luminance signal in the dynamic range data Dd1', to generate dynamic range data YLd1", YLd2" with the same number of bits as the dynamic range data YLd1 and YLd2 before the number of bits was reduced. The value of the added bits may be a predetermined value (either ‘0’ or ‘1’), or the same as the value of the most significant bit, or a value determined by some other method.

If flag tf1 is ‘1’, then from the dynamic range data Dd1, the unaltered dynamic range data CbLd, CrLd of the color difference signals in the compound block are output.

If flag tf1 is ‘0’, then it is determined that no dynamic range data for the color difference signals are included in the dynamic range data Dd1.

If flag tf1 is ‘1’, then from the selected mean value data Dg1, the unaltered mean value data CbLa, CrLa of the color difference signals in the compound block are output.

If flag tf1 is ‘0’, then from the selected mean value data Dg1, the unaltered mean value data CbLa1, CbLa2, CrLa1, CrLa2 of the color difference signals in each unit block are output.

Furthermore, regardless of whether flag tf1 is ‘1’ or ‘0’, the unaltered mean value data YLa1, YLa2 of the luminance signal in each unit block are output from the selected mean value data Dg1.

The image data restorer 63 generates pixel-decimated decoded image data Dk1 on the basis of the decoding parameters ra1 output by the decoding parameter generator 62, flag tf1, and the quantized image data Df1 from the encoded data divider 61.

More specifically, regardless of whether tf1=1 or tf1=0, the image data restorer 63 converts the quantized value of the luminance signal of each pixel in each unit block in the compound block (the compound block being processed) to a reconstructed value (one of the representative values). If the quantized values are represented as 0, 1, 2, or 3, the reconstructed value is related to the quantized value according to equation (6).

When tf1=1 (when at least one of the dynamic ranges CbLd, CrLd is greater than the threshold value ta1), the image data restorer 63 converts the quantized values of the color difference signals in each unit block in the compound block (being processed) to a reconstructed value (one of the representative value). If the quantized values are represented as 0, 1, 2, and 3, the reconstructed value is related to the quantized value according to equation (6).

When tf1=0, (when both of the dynamic ranges CbLd, CrLd is equal to or less than the threshold value ta1), the image data restorer 63 uses the mean values CbLa1, CbLa2, CrLa1, CrLa2 of the color difference signals in each unit block as the reconstructed values CRDb, CRDr of each pixel in each unit block. Specifically, $$CRDb1=CbLa1,$$

$$CRDr1=CbLa2,$$

$$CRDb2=CrLa1,$$

$$CRDr2=CrLa2 \tag{7}$$

The set of these reconstructed values YRD1, YRD2, CRDb, CRDr is output as the pixel-decimated decoded image data Dk1.

The image data corrector 64 performs interpolation on the basis of flag tf1 and the pixel-decimated decoded image data Dk1, generates image data for all pixels prior to decimation (image data comprising a number of pixels equal to the number of pixels in the block image data Dc1), and outputs them as block image data Db1.

Specifically, when tf1=1, for the luminance signal, the number of pixels in each unit block is doubled in the vertical direction, and for the color difference signals, the number of pixels in each unit block is doubled in the vertical direction and doubled in the horizontal direction.

When tf1=0, for the luminance signal, the number of pixels in each unit block is left unaltered in the vertical direction (interpolation is not performed) and for the color difference signals, the reconstructed value of the single pixel is used as the pixel value of all pixels in the two unit blocks.

The block image data Db1 output from the image data corrector 64 are supplied to the variation calculator 8 as the output of decoder 6.

The block data Db0 output from decoder 7 are similarly supplied to the variation calculator 8.

In the example above, as shown in FIGS. 8(*b*) and 9(*b*), one bit flags Fb, Fr were output from the encoded data combiner 46, but a single flag having a value of '0' when dynamic ranges CbLd and CrLd are both equal to or less than the switchover threshold value ta1 and a value of '1' otherwise (having the same value as pa1) may be output from the encoded data combiner 46 instead, and decoder 6 may divide the data on the basis of this flag.

Figure 11:
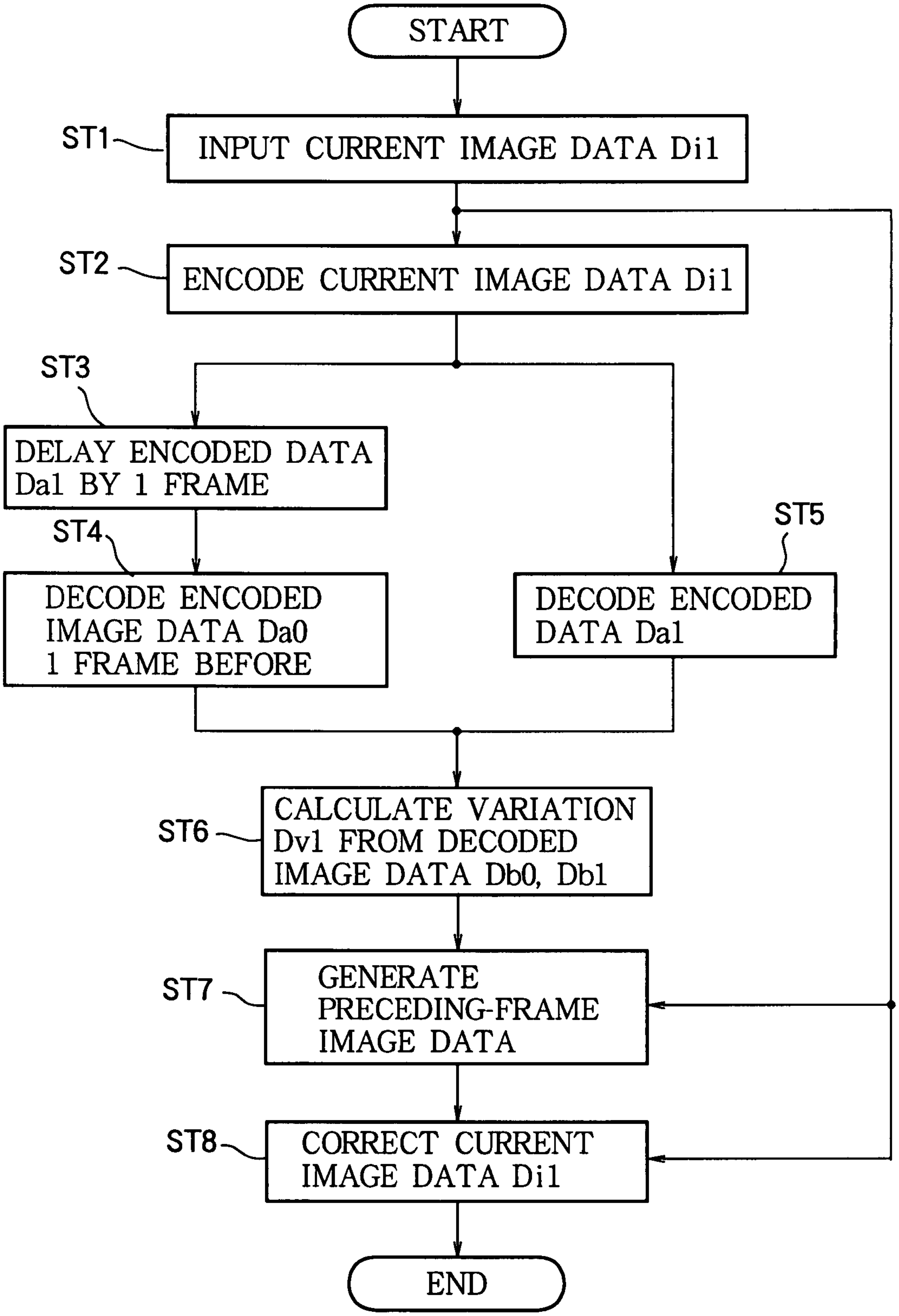
FIG. 11 is a flowchart illustrating the operation of the image processing apparatus in the first embodiment.

The processing performed by the image processing apparatus described above will now be explained with reference to FIG. 11.

First, the current image data Di1 are input to the image data processor 3 (ST1). The encoder 4 encodes the current image data Di1 by a process to be described later with reference to FIG. 12, and outputs the encoded image data Da1 (ST2). The delay circuit 5 delays the encoded image data Da1 by one frame interval and simultaneously outputs the encoded image data Da0 of the preceding frame (ST3). Decoder 7 decodes these encoded data Da0 by a process to be described later with reference to FIG. 13, and outputs decoded image data Db0 corresponding to what was the current image data Di0 one frame before (ST4). Concurrently with the above processing in the delay circuit 5 and decoder 7, decoder 6 decodes encoded data Da1 by the process to be explained later with reference to FIG. 13 and outputs decoded image data Db1 corresponding to the current image data Di1 in the current frame (ST5).

The variation calculator 8 subtracts decoded image data Db1 from decoded image data Db0 to calculate the change in gray-scale value of each pixel from the image one frame before to the current image, and outputs these differences as the variations Dv1 (ST6). The preceding-frame image calculator 9 adds the variations Dv1 to the current image data Di1, and outputs the result as preceding-frame image data Dq0 (ST7).

On the basis of variations in the gray-scale values obtained from a comparison of the current image data Di1 with the preceding-frame image data Dq0, the image data corrector 10 calculates corrections needed to drive the liquid crystal so that it will reach the transmittance specified by the current image data Di1 within a one-frame interval, uses these corrections to correct the current image data Di1, and outputs the corrected image data Dj1 (ST8).

The above processes ST1-ST8 are carried out for each pixel in the current image data Di1. In these processes, the encoding in the encoder 4 and the decoding in the decoders 6, 7 are carried out once for each compound block consisting of two unit blocks.

Figure 12:
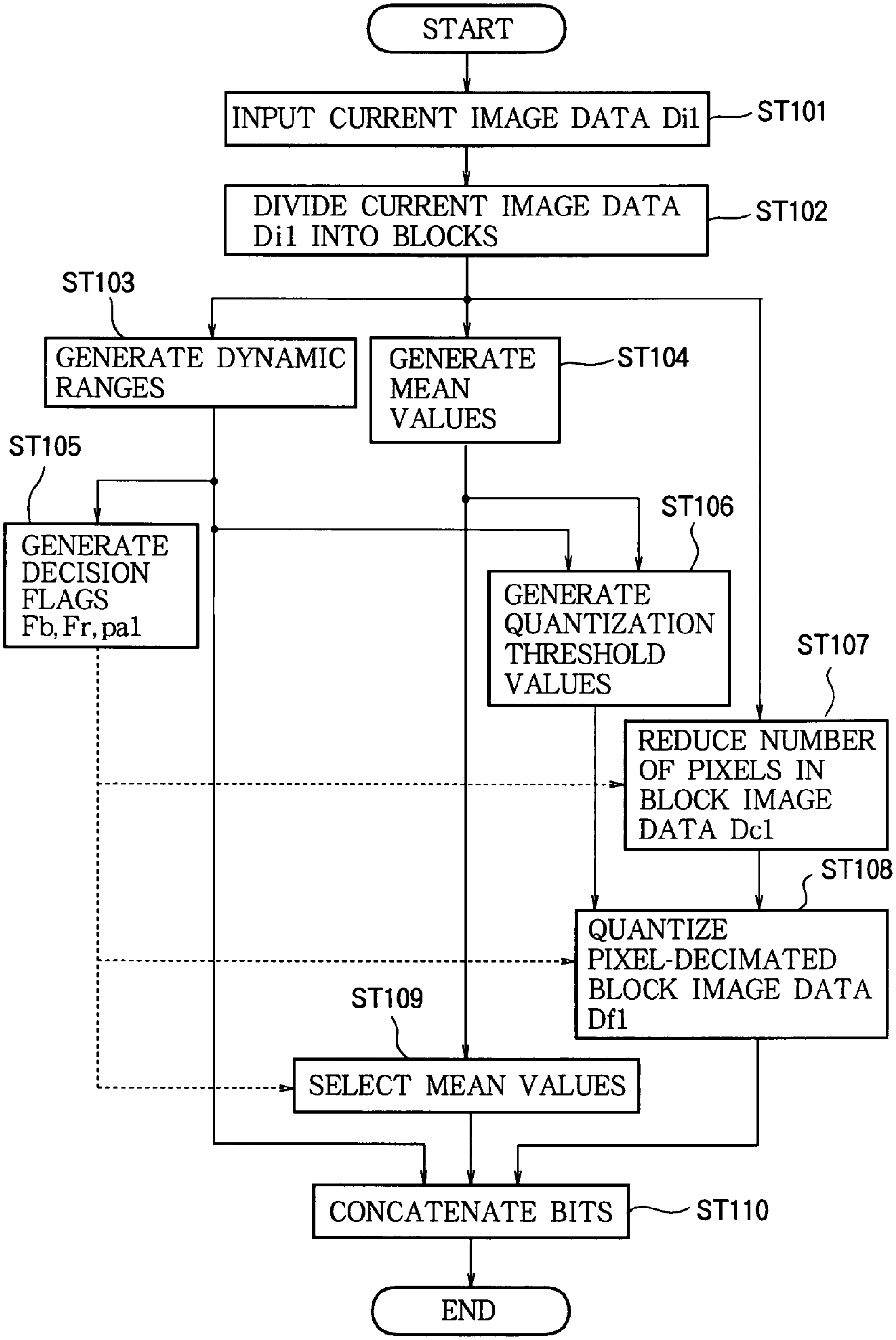
FIG. 12 is a flowchart illustrating the operation of the encoder in the first embodiment.

FIG. 12 is a flowchart illustrating the above-described encoding process in the encoder 4.

First, the current image data Di1 are input to the image data blocker 41 (ST101).

The image data blocker 41 divides the current image data Di1 into unit blocks and outputs block image data Dc1 (ST102).

The dynamic range generator 42 calculates dynamic range data Dd1 for the block image data Dc1 (ST103).

The mean value calculator 43 calculates mean value data De1 for the block image data Dc1 (ST104). The calculated mean values include mean values for the compound block and mean values for each unit block.

The decision circuit 51 outputs decision flags Fb, Fr, pa1 on the basis of results of comparisons of the dynamic ranges CbLd, CrLd of the color difference signals in each unit block, taken from among the dynamic range data Dd1, with the switchover threshold value ta1 (ST105).

The quantizing threshold generator 52 calculates a number of quantization threshold values (collectively referred to as the quantization threshold value data tb1) corresponding to a predetermined number of quantization levels (ST106).

The pixel decimator 53 reduces the number of pixels in the block image data Dc1 on the basis of a reduction in pixel number specified by decision flag pa1, and outputs pixel-decimated block image data Dc1' comprising fewer, or at least not more, pixels than the block image data Dc1 (ST107).

The image data quantizer 54 uses the threshold values tb1 expressed by the quantization value data to quantize each pixel of data in the pixel-decimated block image data Dc1', and outputs the quantized image data Df1 (ST108).

The mean value selector 44 selects the mean values of the compound block or the mean value of each unit block from the mean value data De1 on the basis of decision flag pa1, and outputs the selected mean value data Dg1 (ST109).

The encoded data combiner 46 reduces the number of bits of the dynamic range data YLd1, YLd2 of the luminance signal taken from the dynamic range data Dd1, generates bit-reduced data YLd1', YLd2', and outputs encoded image data Da1 in which the bit-reduced data YLd1', YLd2', flags Fb, Fr, dynamic range data CbLd, CrLd, the selected mean value data Dg1 (the set consisting of YLa1, YLa2, CbLa, and CrLa or the set consisting of YLa1, YLa2, CbLa1, CbLa2, CrLa1, CrLa2), and the quantized image data Df1 (YQ1, YQ2, CbQ, CrQ) are combined by bit concatenation (ST110).

Figure 13:
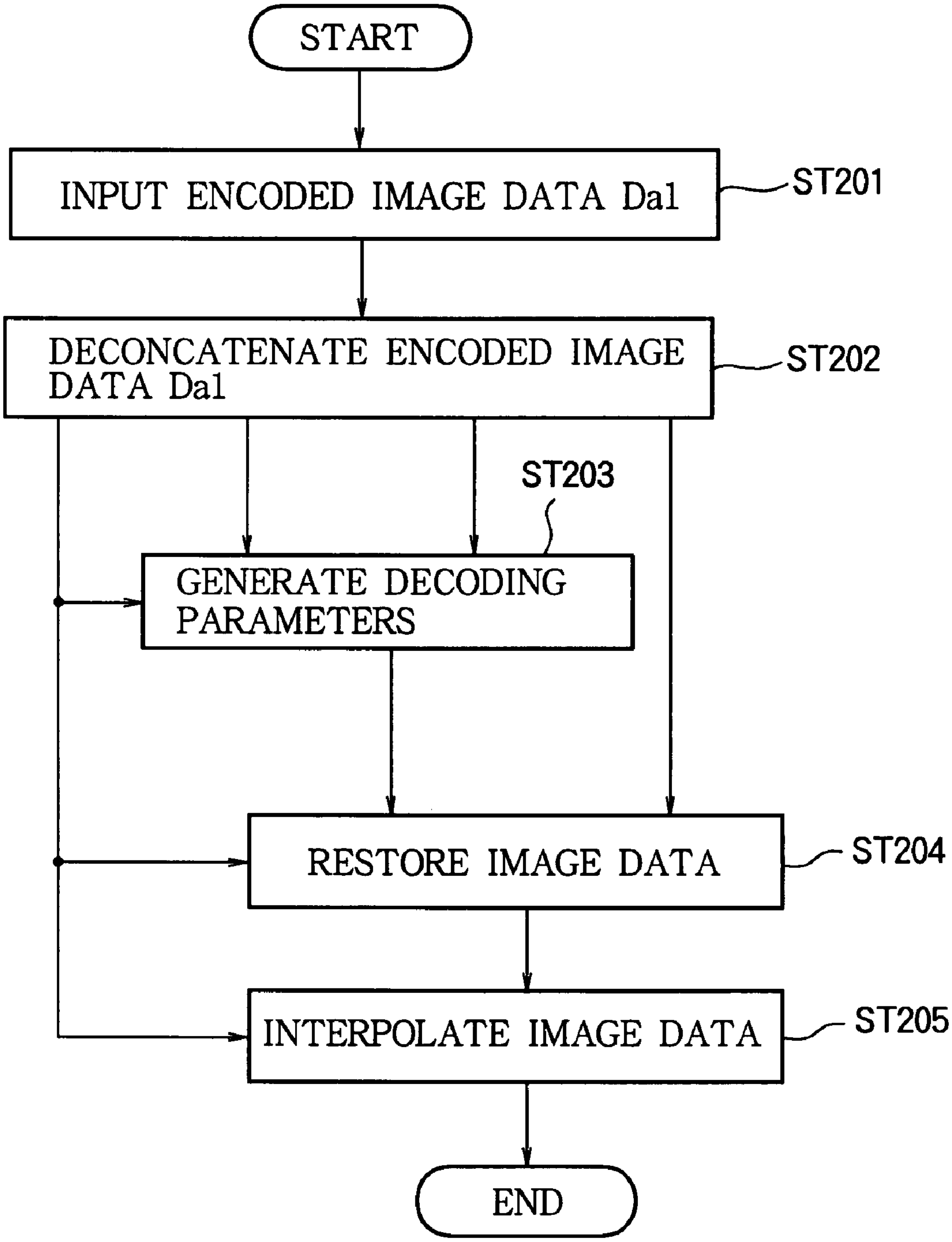
FIG. 13 is a flowchart illustrating the operation of the decoders in the first embodiment.

FIG. 13 is a flowchart showing the decoding process in decoder 6. First, the encoded image data Da1 are input to the decoder 6 (ST201). The encoded data divider 61 refers to the flags Fb, Fr included in the encoded data Da1, and deconcatenates the encoded data Da1 into dynamic range data Dd1', selected mean value data Dg1, and quantized image data Df1, and outputs a flag ft1 (ST202). When at least one of the flags Fb, Fr is '1', the input data are determined to have the structure in FIG. 8(*b*) and are deconcatenated accordingly; when both flags Fb, Fr are '0', the input data are determined to have the structure in FIG. 9(*b*), and are deconcatenated accordingly.

The decoding parameter generator 62 generates decoding parameters ra1 from the dynamic range data Dd1, selected mean value data Dg1, and flag tf1 (ST203). The image data restorer 63 generates pixel-decimated decoded image data Dk1 on the basis of the quantized image data Df1, decoding parameters ra1, and flag tf1 (ST204). The image data corrector 64 outputs decoded image data Db1 comprising the same number of pixels as the block image data Dc1 by performing interpolation on the basis of the pixel decimated image data Dk1, which comprise fewer pixels than the block image data Dc1 (ST205).

The decoding process in decoder 7 is similar to the above.

As described above, in an image processing apparatus according to the present invention, when the dynamic ranges Dd1, more specifically the dynamic ranges CbLd, CrLd of the color difference signals in two unit blocks, are comparatively large, the number of color difference signal pixels is reduced by a comparatively small amount (for example, the number of pixels is halved) and the number of luminance signal pixels is reduced by a comparatively large amount (for example, the number of pixels is halved), and the mean values and dynamic ranges in the compound block are used in compressive encoding. This is equivalent to enlarging the size of the blocks used in block encoding.

When the dynamic ranges Dd1 are comparatively small, more specifically, when the dynamic ranges CbLd, CrLd of the color difference signals in two unit blocks are comparatively small, the number of color difference signal pixels is reduced by a comparatively large amount (for example, the number of pixels per unit block is reduced essentially to one) and the number of luminance signal pixels is reduced by a comparatively small amount (for example, zero, i.e., the number of pixels is not reduced at all), and in addition, the mean values of the color difference signals in the unit blocks are used in compressive encoding. This is equivalent to reducing the size of the blocks used in block encoding.

With this type of control it is possible to reduce the amount of image data temporarily stored in the delay circuit 5, and to reduce the size of the frame memory constituting the delay circuit 5, while minimizing the encoding error that occurs in the encoder 4.

In the description above, the image data corrector 10 calculates corrections based on variations in gray-scale values derived from a comparison of the preceding-frame image data Dq0 and the current image data Di1, and generates corrected image data Dj1, but the configuration may be adapted to store the corrections in a memory such as a lookup table and correct the current image data Di1 by reading the corrections therefrom.

Figure 14:
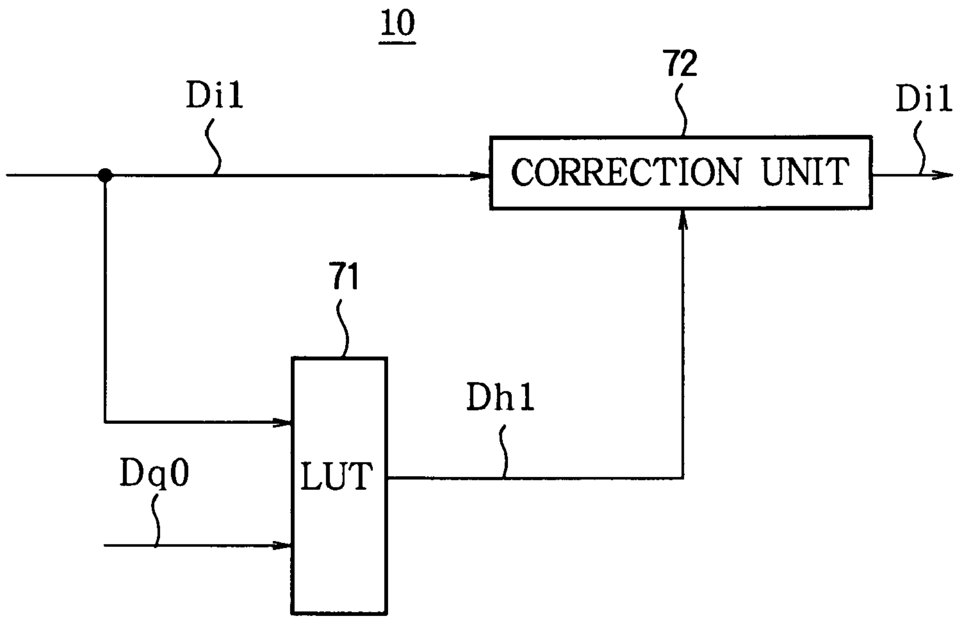
FIG. 14 shows an example of the internal structure of the image data corrector in the first embodiment.
Figure 15:
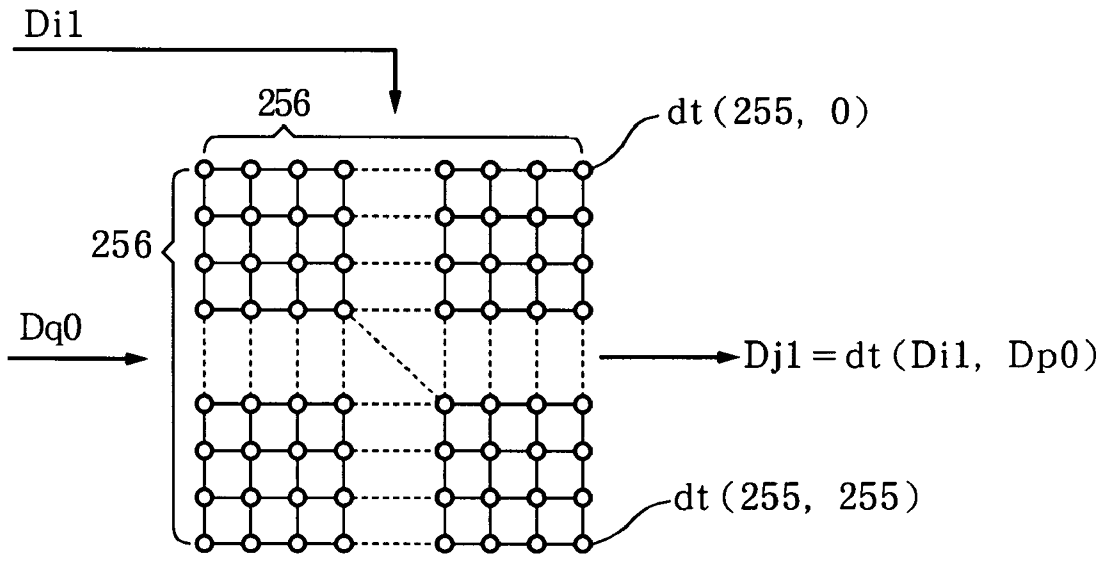
FIG. 15 schematically illustrates the structure of a lookup table.

FIG. 14 is a block diagram showing an example of the internal configuration of the image data corrector 10. The image data corrector 10 shown in FIG. 14 comprises a lookup table (LUT) 71 and a correction unit 72. The lookup table 71 receives the preceding-frame image data Dq0 and the current image data Di1 and outputs a correction Dh1 obtained from the values of the two inputs. FIG. 15 is a schematic drawing showing an exemplary structure of the lookup table 71. The lookup table 71 receives the current image data Di1 and the preceding-frame image data Dq0 as read addresses. If both the current image data Di1 and the preceding-frame image data Dq0 have eight-bit values, the lookup table 71 stores 256×256 data values as corrections Dh1. The lookup table 71 reads and outputs the correction Dh1=dt(Di1, Dq0) corresponding to the values of the current image data Di1 and the preceding-frame image data Dq0. The correction unit 72 adds the correction Dh1 output from the lookup table 71 to the current image data Di1, thereby outputting the corrected image data Dj1.

Figure 16:
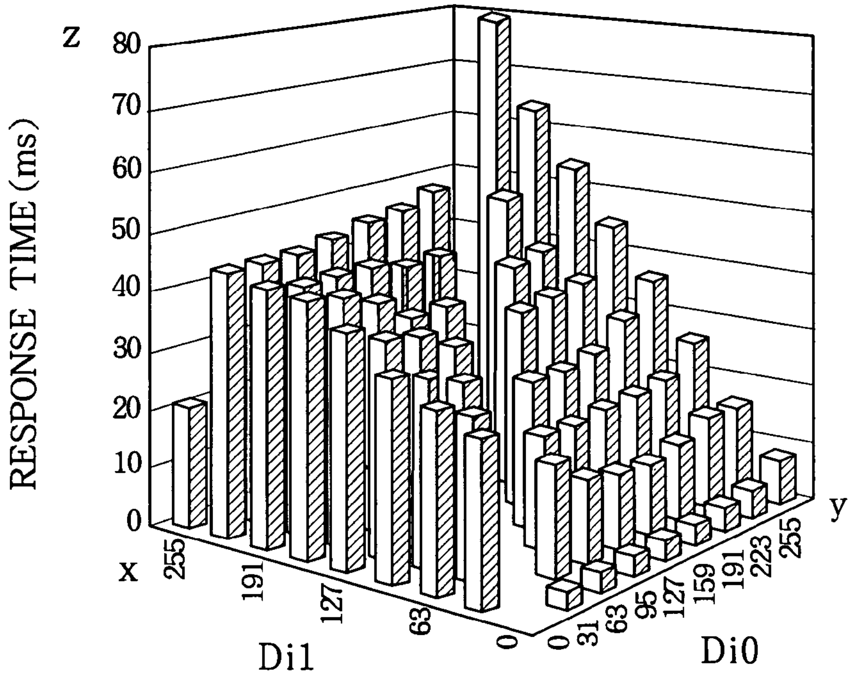
FIG. 16 is a graph showing an example of liquid crystal response speed.

FIG. 16 is a graph showing an example of liquid crystal response speed, the x-axis representing the values of the current image data Di1 (gray-scale values in the current image), the y-axis representing the values of the image data Di0 of the preceding frame (gray-scale values in the preceding-frame image), and the z-axis representing the response times needed to cause the liquid crystal to variation from transmittances corresponding to gray-scale values in the preceding frame to transmittances corresponding to gray-scale values of the current image data Di1. If the current image data have eight-bit gray-scale values, there are 256×256 combinations of gray-scale values of the current image data and the preceding-frame image data, and consequently there are 256×256 different response times. FIG. 16 is simplified to show only 8×8 of the response times corresponding to combinations of the gray-scale values.

Figure 17:
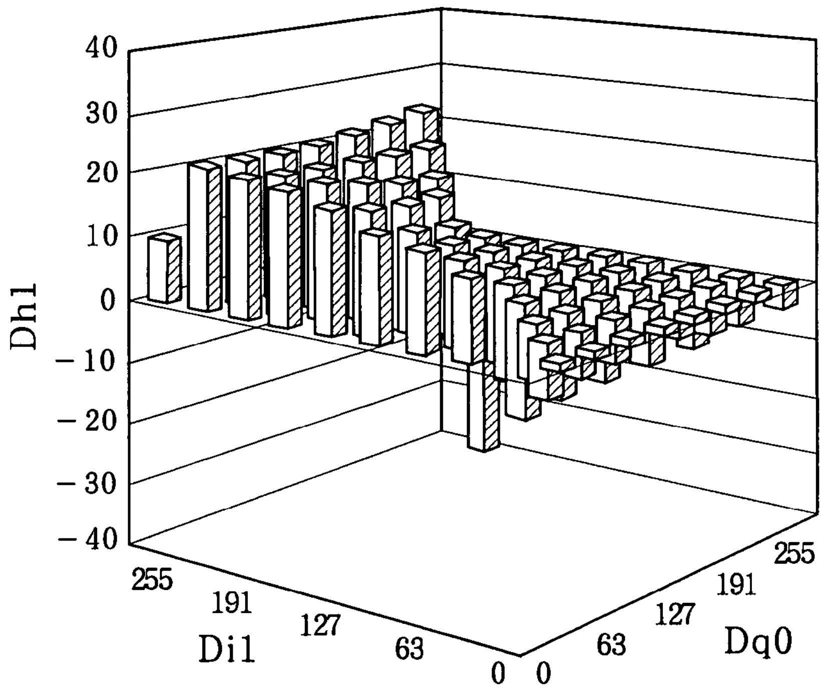
FIG. 17 is a graph showing exemplary corrections.

FIG. 17 is a graph showing corrections Dh1 added to the current image data Di1 so as to cause the liquid crystal to reach the transmittance specified by the current image data Di1 within a one-frame interval. If the current image data have eight-bit gray-scale values, there are 256×256 different corrections Dh1 corresponding to combinations of the gray-scale values of the current image data and the preceding-frame image data. FIG. 17 is simplified to show 8×8 corrections corresponding to combinations of the gray-scale values, as in FIG. 16.

As shown in FIG. 16, the liquid crystal response speed depends on the gray-scale values of the current image data and the preceding-frame image data, so the lookup table 71 stores 256×256 different corrections Dh1 corresponding to combinations of the gray-scale values of the current image data and the preceding-frame image data. The liquid crystal is particularly slow in responding at the intermediate gray levels (gray). Therefore, the response speed can be improved effectively by setting the correction data Dh1=dt(Di1, Dq0) corresponding to preceding-frame image data Dq0 representing an intermediate gray level and current image data Di1 representing a high gray level to large values. Since the response characteristics of liquid crystals vary according to the liquid crystal material, electrode shape, temperature, and so on, the response speed can be controlled according to the particular characteristics of the liquid crystal used by storing corrections Dh1 corresponding to these usage conditions in the lookup table 71.

By using a lookup table 71 storing precalculated corrections Dh1 as above, the amount of computation performed when the corrected image data Dj1 are output can be reduced.

Figure 18:
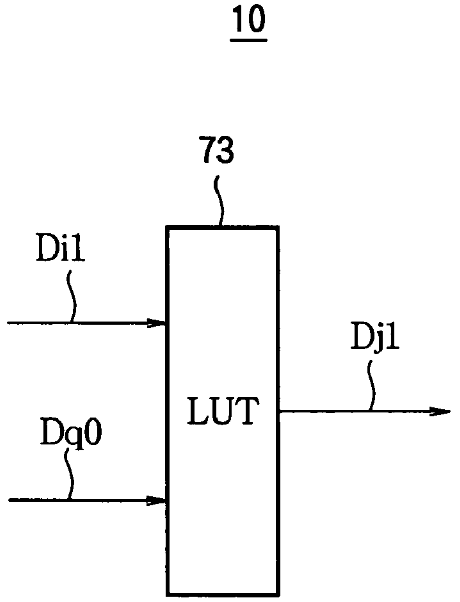
FIG. 18 shows another example of the internal structure of the image data corrector.

FIG. 18 is a block diagram showing another example of the internal structure of the image data correction circuit 10 according to this embodiment. The lookup table 73 shown in FIG. 18 receives the preceding-frame image data Dq0 and the current image data Di1 and outputs the corrected image data Dj1. The lookup table 11*e* stores the corrected image data Dj1 obtained by adding the 256×256 different corrections Dh1 shown in FIG. 17. The corrected image data Dj1 are specified within the gray-scale range that can be displayed by the display unit 11.

Figure 19:
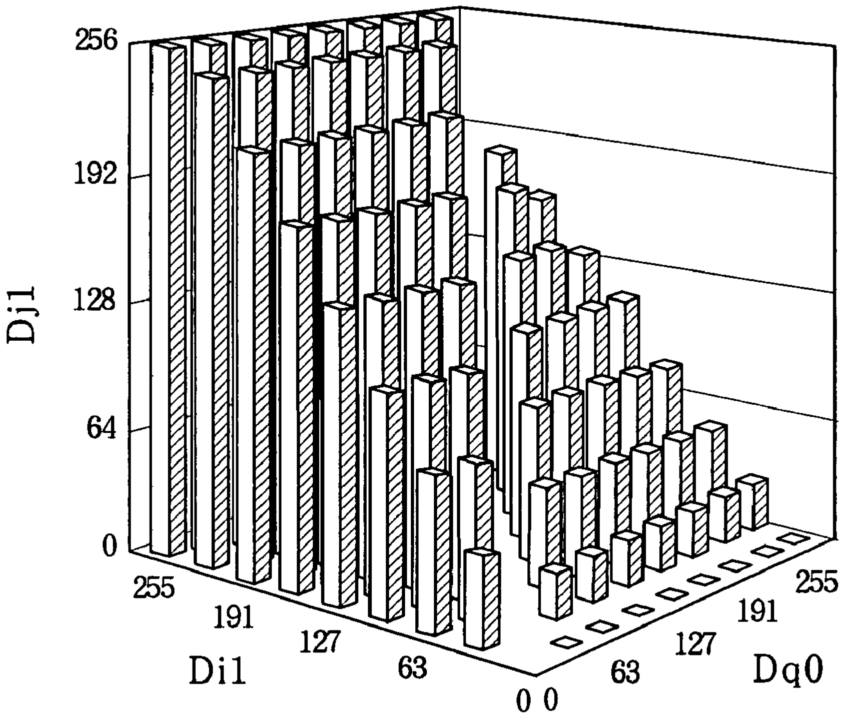
FIG. 19 shows an example of corrected image data.

FIG. 19 is a drawing showing an example of corrected image data Dj1 stored in the lookup table 73. If the current image data have eight-bit gray-scale values, there are 256×256 items of corrected image data Dj1 corresponding to combinations of the gray-scale values of the current image data and the preceding-frame image data. FIG. 19 is simplified to show the corrected image data corresponding to 8×8 combinations of the gray-scale values.

The amount of calculation needed to output the corrected image data Dj1 can be reduced further by storing the corrected image data Dj1 in the lookup table 73 and outputting the corrected image data Dj1 in accordance with the current image data Di1 and the preceding-frame image data Dq0.

In the image processing apparatus according to the embodiments described above, when the dynamic ranges of the color difference signals in each compound block are comparatively small, the number of pixels of the color difference signals Cb, Cr is reduced by a comparatively large amount (for example, the number of pixels in each unit block constituting a compound block is reduced to substantially one) and the number of pixels of the luminance signal Y is reduced by a smaller amount (for example, the luminance signal Y may be decimated by zero pixels), so it is possible to hold the amount of data per compound block in the encoded image data fixed while reducing encoding error.

The encoding error that occurs due to pixel decimation is reduced by controlling the process so that when the dynamic range of the color difference signals in each compound block is comparatively small, the color difference signals Cb, Cr are decimated by a comparatively large amount and the block size is made comparatively small (by encoding each unit block by using its mean value), so even when the compression ratio is increased, it is possible to generate corrected image data Dj1 with little error. Thus, even if the quantity of image data is reduced by coding, the response speed of the liquid crystal can be properly controlled, without applying unnecessary excessive voltages due to encoding errors, so it is possible to reduce the size of the frame memory in the delay circuit 5 necessary for delaying the encoded image data Da1.

Although each compound block comprised two horizontally adjacent unit blocks in the embodiment above, each compound block may comprise three or more consecutive unit blocks. Alternatively, a compound block may comprise a plurality of vertically consecutive unit blocks. Furthermore, a compound block may comprise n×m unit blocks (where n and m are integers equal to or greater than two) that follow each other consecutively in the horizontal and vertical directions.

Although the process of switching selections etc. was carried out on the basis of the dynamic ranges (CbLd, CrLd) of the color difference signals in each compound block in the embodiment above, the process of switching selections etc. may be carried out on the basis of the dynamic ranges (CbLd1, CbLd2, CrLd1, CrLd2) of the color difference signals in each unit block.

Alternatively, the process of switching selections etc. may be carried out on the basis of the dynamic range of the luminance signal instead of the color difference signals.

Although the selection of the mean value of each unit block or the mean value of the compound block was made for the color difference signals in the embodiment above, the selection of the mean value of each unit block or the mean value of the compound block may be made for the luminance signal.

Although the image data in the embodiment above comprised a luminance signal and color difference signals, they may be expressed by color component signals other than color difference signals. In that case, the color component signals are used in place of the color difference signals in the above embodiment.

Those skilled in the art will recognize that further variations are possible within the scope of the invention, which is defined in the appended claims.

What is claimed is:

1. A liquid-crystal-driving image processing circuit that receives image data corresponding to voltages applied to a liquid crystal, the image data indicating gray-scale values of pixels in an image, corrects the image data according to variations in the gray-scale values of the pixels, and outputs the corrected image data, comprising:

an encoder that compressively encodes the image data representing a current frame of the image block by block, thereby outputting encoded image data corresponding to the image in the current frame;

a first decoder that decodes the encoded image data output by the encoder, thereby outputting first decoded image data corresponding to the image data of the current frame;

a delay circuit that delays the encoded image data output by the encoder for an interval corresponding to one frame;

a second decoder that decodes the encoded image data output from the delay circuit, thereby outputting second decoded image data corresponding to the image data one frame before the current frame;

a variation calculator that determines variations of the pixels between the first decoded data and the second decoded data;

a preceding-frame image calculator that uses the image data of the current frame and said variations to calculate reconstructed image data corresponding to the image data one frame before the current frame; and an image data corrector that corrects the gray-scale values of the image in the current frame on a basis of the image data of the current frame and the reconstructed image data;

wherein the encoder includes an image data blocker that divides the image data into a plurality of non-overlapping unit blocks and outputting block image data, a dynamic range generator that determines a dynamic range of the block image data in each unit block, or in each compound block consisting of a plurality of consecutive blocks, and a mean value generator that outputs, as mean value data, a mean value of the image data in each unit block in the current frame or a mean value of the image data in a compound block including the unit block, on the basis of the dynamic range data, and further wherein the mean value generator includes:

a mean value calculator that calculates mean values in each unit block and mean values in the compound block;

a mean value selector that selects one of the mean value of each unit block and the mean value of the compound block according to the dynamic range.

2. A liquid-crystal-driving image processing circuit that receives image data corresponding to voltages applied to a liquid crystal, the image data indicating gray-scale values of pixels in an image, corrects the image data according to variations in the gray-scale values of the pixels, and outputs the corrected image data, comprising:

an encoder that compressively encodes the image data representing a current frame of the image block by block, thereby outputting encoded image data corresponding to the image in the current frame;

a first decoder that decodes the encoded image data output by the encoder, thereby outputting first decoded image data corresponding to the image data of the current frame;

a delay circuit that delays the encoded image data output by the encoder for an interval corresponding to one frame;

a second decoder that decodes the encoded image data output from the delay circuit, thereby outputting second decoded image data corresponding to the image data one frame before the current frame;

a variation calculator that determines variations of the pixels between the first decoded data and the second decoded data;

a preceding-frame image calculator that uses the image data of the current frame and said variations to calculate reconstructed image data corresponding to the image data one frame before the current frame; and an image data corrector that corrects the gray-scale values of the image in the current frame on a basis of the image data of the current frame and the reconstructed image data;

wherein the encoder includes an image data blocker that divides the image data into a plurality of non-overlapping unit blocks and outputting block image data, a dynamic range generator that determines a dynamic range of the block image data in each unit block, or in each compound block consisting of a plurality of consecutive blocks, a mean value generator that outputs, as mean value data, a mean value of the image data in each unit block in the current frame or a mean value of the image data in a compound block including the unit block, on the basis of the dynamic range data; and a pixel decimator that reduces the number of pixels for which quantized values are determined, and the pixel decimator adjusts the amount by which the number of pixels is reduced according to the dynamic range data.

3. The image processing apparatus of claim 2, wherein the encoder further comprises:

a quantizer that quantizes the image data with the reduced number of pixels by using the dynamic range data and a quantizing threshold value determined according to the mean value data, and outputting the quantized image data; and an encoded data combiner that outputs, from the quantized image data, the dynamic range data, and the mean value data, encoded image data corresponding to the block image data.

4. The image processing apparatus of claim 2, wherein the pixel decimator adjusts the amount by which the number of pixels is reduced according to the dynamic range data so as to produce a constant amount of data for each compound block of the encoded image data.

5. The image processing apparatus of claim 2, wherein the mean value generator outputs the mean value of the image data of a color component signal in each unit block in the current frame or a mean value of the image data the color component signal in a compound block including the unit block.

6. The image processing apparatus of claim 2, wherein, when the dynamic range of a color component signal in each compound block of the color component signal of the image data in the current frame is less than a predetermined value, the mean value generator outputs the mean value of the image data of a color component signal in each unit block.

7. An image display device incorporating the image processing apparatus of claim 2.

8. An image processing method for receiving image data corresponding to voltages applied to a liquid crystal, the image data indicating gray-scale values of pixels in an image, correcting the image data according to variations in the gray-scale values of the pixels, and outputting the corrected image data, comprising:

an encoding step for compressively encoding the image data representing a current frame of the image block by block, thereby outputting encoded image data corresponding to the image in the current frame;

a first decoding step for decoding the encoded image data output by the encoding step, thereby outputting first decoded image data corresponding to the image data of the current frame;

a delay step for delaying the encoded image data output by the encoding step for an interval corresponding to one frame;

a second decoding step for decoding the encoded image data output from the delay step, thereby outputting second decoded image data corresponding to the image data one frame before the current frame;

a variation calculation step for determining variations of the pixels between the first decoded data and the second decoded data;

a preceding-frame image calculation step for using the image data of the current frame and said variations to calculate reconstructed image data corresponding to the image data one frame before the current frame; and an image data correction step for correcting the gray-scale values of the image in the current frame on a basis of the image data of the current frame and the reconstructed image data;

wherein the encoding step includes a data blocking step for dividing the image data into a plurality of non-overlapping unit blocks and outputting block image data, a dynamic range generating step for determining a dynamic range of the block image data in each unit block, or in each compound block consisting of a plurality of consecutive blocks, and a mean value generating step for outputting, as mean value data, a mean value of the image data in each unit block in the current frame or a mean value of the image data in a compound block including the unit block, on the basis of the dynamic range data, wherein the mean value generating step includes:

a mean value calculating step for calculating mean values in each unit block and mean values in the compound block; and a mean value selecting step for selecting one of the mean value of each unit block and the mean value of the compound block according to the dynamic range.

* * * * *